(12) United States Patent
Traina et al.

(10) Patent No.: US 10,546,342 B2
(45) Date of Patent: Jan. 28, 2020

(54) SYSTEMS AND METHODS OF PROCESSING INFORMATION AND TRANSACTIONS INVOLVING DIGITAL CONTENT, DIGITAL PRODUCTS AND/OR EXPERIENCES

(71) Applicant: Traina Interactive Corp., San Francisco, CA (US)

(72) Inventors: Trevor Dow Traina, San Francisco, CA (US); Joseph Peter Vierra, Hayward, CA (US); Jennifer Chih-Ting Chen, San Francisco, CA (US); Mitchell Paul Galbraith, Los Altos, CA (US)

(73) Assignee: TRAINA INTERACTIVE CORP., San Francisco, CA (US)

( * ) Notice: Subject to any disclaimer, the term of this patent is extended or adjusted under 35 U.S.C. 154(b) by 372 days.

(21) Appl. No.: 15/347,598

(22) Filed: Nov. 9, 2016

(65) Prior Publication Data
US 2017/0221133 A1 Aug. 3, 2017

Related U.S. Application Data

(63) Continuation of application No. 14/306,179, filed on Jun. 16, 2014, now abandoned, which is a
(Continued)

(51) Int. Cl.
| | |
|---|---|
| *G06Q 30/00* | (2012.01) |
| *G06Q 30/06* | (2012.01) |
| *G06Q 20/12* | (2012.01) |
| *G06Q 10/10* | (2012.01) |
| *G06Q 50/18* | (2012.01) |

(52) U.S. Cl.
CPC ..... *G06Q 30/0635* (2013.01); *G06Q 10/1095* (2013.01); *G06Q 20/123* (2013.01); *G06Q 30/0621* (2013.01); *G06Q 50/188* (2013.01)

(58) Field of Classification Search
None
See application file for complete search history.

(56) References Cited

U.S. PATENT DOCUMENTS

| | | |
|---|---|---|
| 6,012,051 A | 1/2000 | Sammon et al. |
| 7,263,497 B1 | 8/2007 | Wiser et al. |

(Continued)

FOREIGN PATENT DOCUMENTS

WO WO 2008/109705 3/2008

OTHER PUBLICATIONS

European Search Report dated Apr. 20, 2016 in European Application No. 13822770.7; 9 pages.
(Continued)

*Primary Examiner* — Mila Airapetian
(74) *Attorney, Agent, or Firm* — Morgan, Lewis & Bockius LLP

(57) ABSTRACT

Systems and methods described herein relate to processing of information, data and transactions involving content and/or experiences. According to one exemplary implementation, an illustrative method of computerized information processing may involve handling and/or processing data regarding a product, the product comprising an experience, a physical product, and/or a digital product.

33 Claims, 20 Drawing Sheets

Related U.S. Application Data continuation of application No. 14/190,034, filed on Feb. 25, 2014, now Pat. No. 10,121,183, and a continuation-in-part of application No. 13/868,031, filed on Apr. 22, 2013, now Pat. No. 8,756,110, and a continuation of application No. PCT/US2013/052150, filed on Jul. 25, 2013, said application No. 14/190,034 is a continuation of application No. PCT/US2013/052150, filed on Jul. 25, 2013, which is a continuation of application No. 13/868,031, filed on Apr. 22, 2013, now Pat. No. 8,756,110.

(60) Provisional application No. 61/675,795, filed on Jul. 25, 2012, provisional application No. 61/675,801, filed on Jul. 25, 2012, provisional application No. 61/675,790, filed on Jul. 25, 2012.

(56) References Cited

U.S. PATENT DOCUMENTS

| | | | |
|---|---|---|---|
| 8,688,540 B1 | 4/2014 | Patel et al. | |
| 8,756,110 B2 | 6/2014 | Traina et al. | |
| 8,811,794 B2 | 8/2014 | Traina | |
| 9,123,073 B2 | 9/2015 | Traina | |
| 9,245,291 B1 | 1/2016 | Ballaro | |
| 2003/0154135 A1 | 8/2003 | Covington | |
| 2003/0220826 A1 | 11/2003 | Mansour | |
| 2005/0197940 A1 | 9/2005 | Williams et al. | |
| 2005/0229227 A1* | 10/2005 | Rogers | G06Q 30/02 725/115 |
| 2006/0089849 A1 | 4/2006 | Irby | |
| 2006/0116900 A1 | 6/2006 | Jensen | |
| 2006/0168147 A1 | 7/2006 | Inoue | |
| 2007/0036287 A1* | 2/2007 | Campbell | G06Q 10/02 379/67.1 |
| 2007/0116216 A1 | 5/2007 | Carmichael | |
| 2007/0143205 A1 | 6/2007 | Starmanns | |
| 2008/0005017 A1* | 1/2008 | Poster | G06Q 20/10 705/39 |
| 2008/0104496 A1 | 5/2008 | Williams | |
| 2008/0147741 A1 | 6/2008 | Gonen et al. | |
| 2008/0275786 A1 | 11/2008 | Gluck | |
| 2009/0112680 A1* | 4/2009 | Dovrath | G06Q 30/0215 705/26.3 |
| 2009/0112916 A1 | 4/2009 | Stuhec | |
| 2009/0132389 A1 | 5/2009 | Klinger et al. | |
| 2010/0069131 A1 | 3/2010 | Rochet | |
| 2010/0180207 A1 | 7/2010 | MacGuire | |
| 2012/0179556 A1 | 7/2012 | Ertas | |
| 2012/0226588 A1 | 9/2012 | Wuhrer et al. | |
| 2013/0035955 A1 | 2/2013 | Torres | |
| 2013/0041772 A1* | 2/2013 | Aggrey | G06Q 10/109 705/26.3 |
| 2013/0054423 A1 | 2/2013 | Hwang | |
| 2013/0103435 A1 | 4/2013 | Chhabria | |
| 2013/0246633 A1* | 9/2013 | Giesen | H04L 65/10 709/227 |
| 2013/0275274 A1 | 10/2013 | Breaux et al. | |
| 2013/0290149 A1 | 10/2013 | Rashwan | |
| 2013/0339084 A1 | 12/2013 | Kahn | |
| 2013/0339109 A1 | 12/2013 | Steelberg | |
| 2014/0067597 A1 | 3/2014 | Kirkby | |

OTHER PUBLICATIONS

International Search Report and Written Opinion dated Jun. 9, 2016 received in International Application No. PCT/US2015/056287; 15 pages.

International Search Report and Written Opinion of the International Searching Authority dated Feb. 4, 2014 in PCT Application No. PCT/US2013/052150, 13 pages.

* cited by examiner

FIG. 10

Celebrate with Me welcome | Cart(0) | Account | Log In

Let me help you celebrate friends' and family members' birthdays, anniversaries, and more. Join me in supporting G-Unity Foundation

Complete Your Purchase

Shipping | Billing | Review | Confirmation

Order Total
- Cart Total $xx.xx
- Tax $xx.xx — 1112
- Shipping $xx.xx
- Order Total $xx.xx — 1116

Shopping Cart [Edit cart]

Twitter Shout-out — 1114

Autographed Lyrics Sheet

Shipping Contact
- First Name [        ]
- Last Name [        ]
- Phone [    ] - [    ]

Shipping Address — 1110
- Company Name [        ]
- Street adderss [        ]
- Apt / Ste / Bldg [        ]
- ZipCode [94904]  [San Franciso]
- United States Gift Message [        ]

Shipping Options
- ⊙ Standard Shipping (5-7 Business Days)
- ○ Expedited Shipping (2-3 Business Days)

Shipping Policy
- Signature is not required for delivery
- We do not ship to PO Boxes
- Shipping estimates include preparation and shipping time
- We do not ship directly to APO/FPO addresses

[Cancel]  [Continue]

TERMS AND CONDITIONS | PRIVACY POLICY | ABOUT IFONLY

SYSTEMS AND METHODS OF PROCESSING INFORMATION AND TRANSACTIONS INVOLVING DIGITAL CONTENT, DIGITAL PRODUCTS AND/OR EXPERIENCES

CROSS REFERENCE TO RELATED APPLICATION(S) INFORMATION

This is a continuation of application Ser. No. 14/306,179, filed Jun. 16, 2014, published as US2014/0297454A1, which is: a continuation of application Ser. No. 14/190,034, filed Feb. 25, 2014, published as US2014/0180879A1, a continuation (bypass) of application No. PCT/US2013/052150, filed Jul. 25, 2013, and a continuation-in-part of application Ser. No. 13/868,031, filed Apr. 22, 2013, published as US2014/0032371A1, and claims benefit/priority of U.S. provisional patent application Nos. 61/675,790, 61/675,795, and 61/675,801, all filed Jul. 25, 2012, which are all incorporated herein by reference in entirety.

APPENDIX MATERIALS

Appendices, labeled "Appendix A", and "Appendix B" are attached hereto and incorporated by reference herein in their entirety. This application also includes and hereby incorporates by reference computer program appendix materials submitted herewith as another Appendix of related code.

BACKGROUND

Field

Implementations herein relate to systems and methods of processing information associated with networked systems including features and functionality related to allowing first users, such as celebrities and luminaries, to interact and process transactions with other users, such as fans of the celebrities and luminaries.

Description of Related Information and Demand:

Celebrities want to offer their work and/or content directly to their fans without gatekeepers like networks, publishers, and record labels, and other middlemen standing in the way preventing them from doing so or taking a large cut of their revenue they could realize from such offerings. The few mundane options that exist have so many drawbacks that they are typically not worth the time needed to employ them.

Fans that are passionate i.e. 'power fan' users are willing to pay for exclusive content and opportunities from the celebrities they idolize. Moreover, celebrities would like an easy and reputation-preserving way to make money by selling content and experiences to fans, but there are currently many barriers to doing this in a meaningful and efficient way. The lack of a platform/marketplace to facilitate such transactions results in a great deal of pent-up supply and unfulfilled demand. There is a need for systems and methods that solve such problems, e.g., via implementations that involve features such as publicizing this opportunity, registering and enrolling fans and users, collecting revenue, offering access to digital content and other opportunities directly to the fans/users for a set price, for instance a monthly subscription price, and/or delivering the content and opportunities on behalf of the celebrity.

BRIEF DESCRIPTION OF THE DRAWINGS

For a better understanding of the various implementations described in this application, reference should be made to the Detailed Description below, in conjunction with the following drawings in which like reference numerals refer to corresponding parts throughout the figures.

FIG. 10 is an illustration of exemplary shopping cart/ordering pages, consistent with one or more aspects related to the innovations herein.

FIG. 11 is an illustration of exemplary checkout/shipping pages, consistent with one or more aspects related to the innovations herein.

FIG. 12 is an illustration of exemplary billing/purchasing pages, consistent with one or more aspects related to the innovations herein.

FIG. 14 is an illustration of exemplary purchase finalization pages, consistent with one or more aspects related to the innovations herein.

DETAILED DESCRIPTION OF ILLUSTRATIVE IMPLEMENTATIONS

Figure 1:
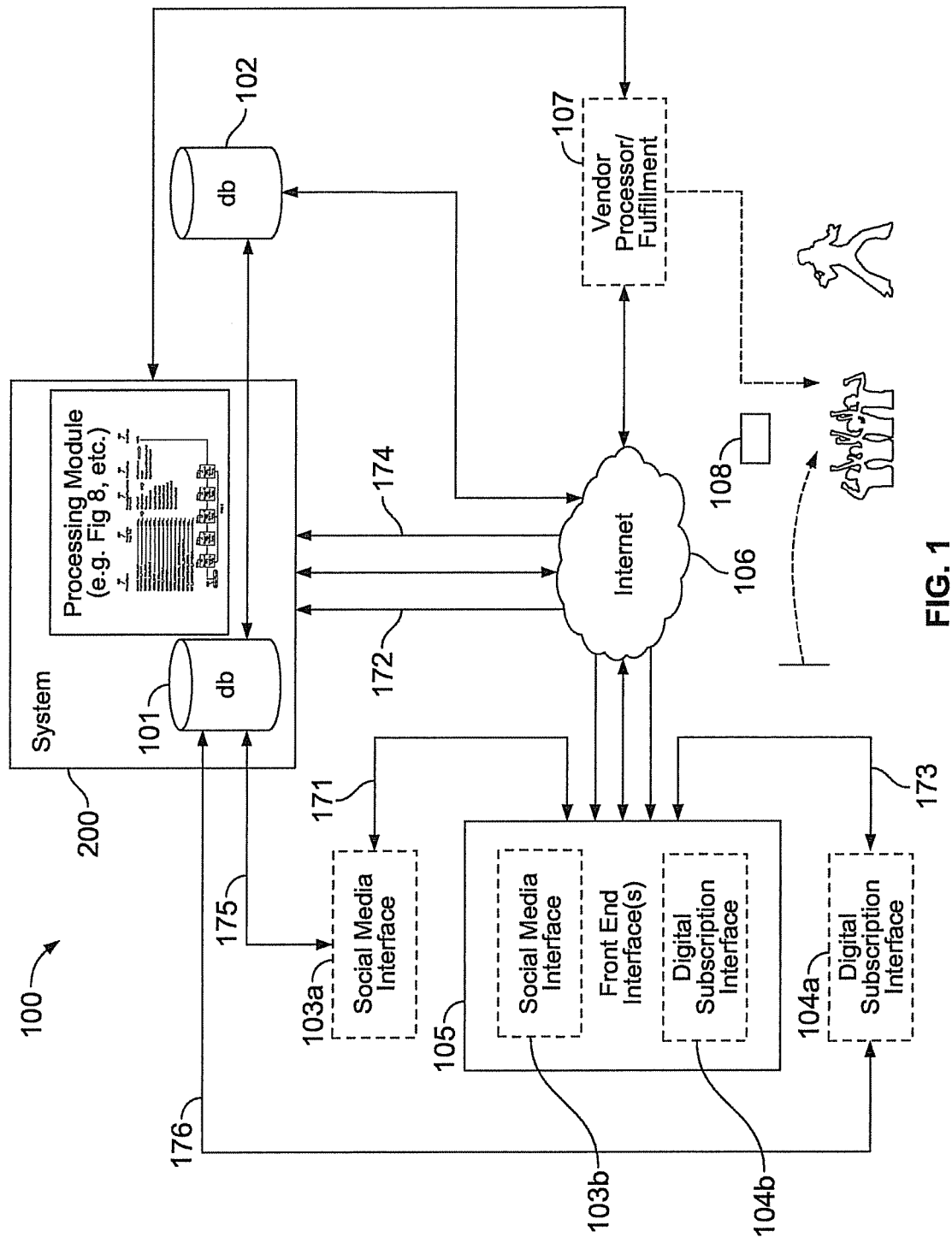
FIG. 1 is a block diagram depicting an illustrative system and interactions between components thereof, consistent with one or more aspects related to the innovations herein.

Reference will now be made in detail to exemplary implementations, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, particular aspects described herein are provided by way of example and should not be used to limit the scope of the invention to these particular implementations. In other instances, certain well-known data structures, timing protocols, software operations, procedures, and components have not been described in detail so as not to unnecessarily obscure aspects of the embodiments of the invention.

Celebrities want to offer their work and/or content directly to their fans/users without gatekeepers such as third party networks, publishers, and record labels, and other middlemen standing in the way preventing them from doing so or taking revenue they could realize from such offerings. Accordingly, the present systems and methods allow celebrities, via platform tools and computer network features and functionality as set forth herein, to offer access to digital content and other opportunities directly to the fans/users for a set price, for instance, a monthly subscription price.

"Celebrities" as referenced in this disclosure include, but are not limited to, individuals who possess extraordinary ability in the sciences, arts, education, business, or athletics, or who have a demonstrated record of extraordinary achievement in the motion picture or television industry and have been recognized nationally or internationally for those achievements. "Celebrities" as referenced in this disclosure also include luminaries: people who are generally accomplished and marketable.

Implementations herein provide a technology platform and/or systems or methods that may make the process for exclusive subscription based digital media content between a celebrity and a fan centralized without middlemen, according to some embodiments. This system provides a social middleware and a data platform by reducing transactional friction and providing transaction sharing, security, and privacy. It can also provide personal verification for fans/users.

From a fan/user's perspective, there is currently a barrier between them and the person whom they admire. The fan/user often desires direct interaction with these celebrities but security concerns can keep celebrities away from personal interactions and events that make that viable. Currently, fans/users must work hard to find memorabilia auctions or follow those they admire social media sites, but the fan/user must proactively search these out. Fans/users also use entertainment news, fan magazines and fan clubs, but, among other things, these channels of information are not personal, two-way, or unique. Fans/users may also attend live events to meet or experience being near celebrities, for example, book signings, concerts, conventions, sporting events and charity fundraisers are among the most popular ways fans/users have an experience with their favorite celebrities. However, all of these lack an element of uniqueness and exclusivity, which this system can facilitate.

FIG. 1 is a block diagram depicting an illustrative system and interactions between components thereof, consistent with one or more aspects related to the innovations herein. Referring to FIG. 1, such system may serve as a direct channel that automates the connection between celebrities, their fans/users and/or other people or entities who want to offer them opportunities. In some implementations, it may be configured as a connection platform providing delivery and authentication of premium content and unique experiences for fans/users. As mentioned above, celebrity time and attention is a commodity that is often under-leveraged. Systems herein serve as a marketplace for that commodity. The site and platform need not necessarily eliminate intermediary parties (agent, manager, publicist, etc.), but they may render their job more efficient by enabling middlemen to evaluate celebrity placements and focus on those considered more worthwhile. A celebrity may employ agents in addition to the systems and methods herein to maximize opportunities. Celebrities may also feel more comfortable using this system, as opposed to existing social media platforms, because it has cloaking tools that preserve their privacy while ensuring authenticity for a fan.

Computer networks as well as associated computer components and processing may be leveraged to provide such communication ability and direct exposure. The illustrative diagram of FIG. 1 shows an example of such a network 100. For instance, an experience fulfillment internal database 101 may be in communication with an experience fulfillment system 200. The experience fulfillment system 200 may be configured in communication with one or more external databases 102, a vendor fulfillment component 105, the Internet 104, and a front end social networking site application interface 103 by way of the Internet 104. Other system configurations may be possible. For example, only an internal database 101 or external database 102 may be provided, and/or the network 100 components may communicate via connections other than the Internet 104.

The front end interface 105 is the forward facing interface for customers (typically, but not necessarily, fans). The vendor fulfillment component is the rear facing part of the system that connects with vendors (typically, but not necessarily, celebrities, public figures, their management, or other related personnel). Thus, the experience fulfillment system 200 and experience fulfillment internal database 101 allow the customers and the vendors to connect, both in an information processing context and directly. The system enables physical or digital experiences or services to be scheduled, planned, occur, etc., without third party complications or intervention. The system may be configured to function with physical products/experiences and/or digital products/experiences 108.

In some implementations, vendors may upload experience-based products which appear on the front end interface 105. The customers may then find the experiences and/or products on the front end interface 105 and purchase these experiences and/or products. The experience fulfillment system 200 may also generate information such as confirmation messages to both the customers and vendors. The experience fulfillment system 200 handles the financial aspects of the transactions and/or bank interactions. Vendor and customer may optionally negotiate a schedule for the experience as well as a location for the experience, be it either digital or physical. Customers and vendors can check the status of the experience deal by logging into the front end interface 105 or by receiving status updates from the experience fulfillment system 200.

Figure 2:
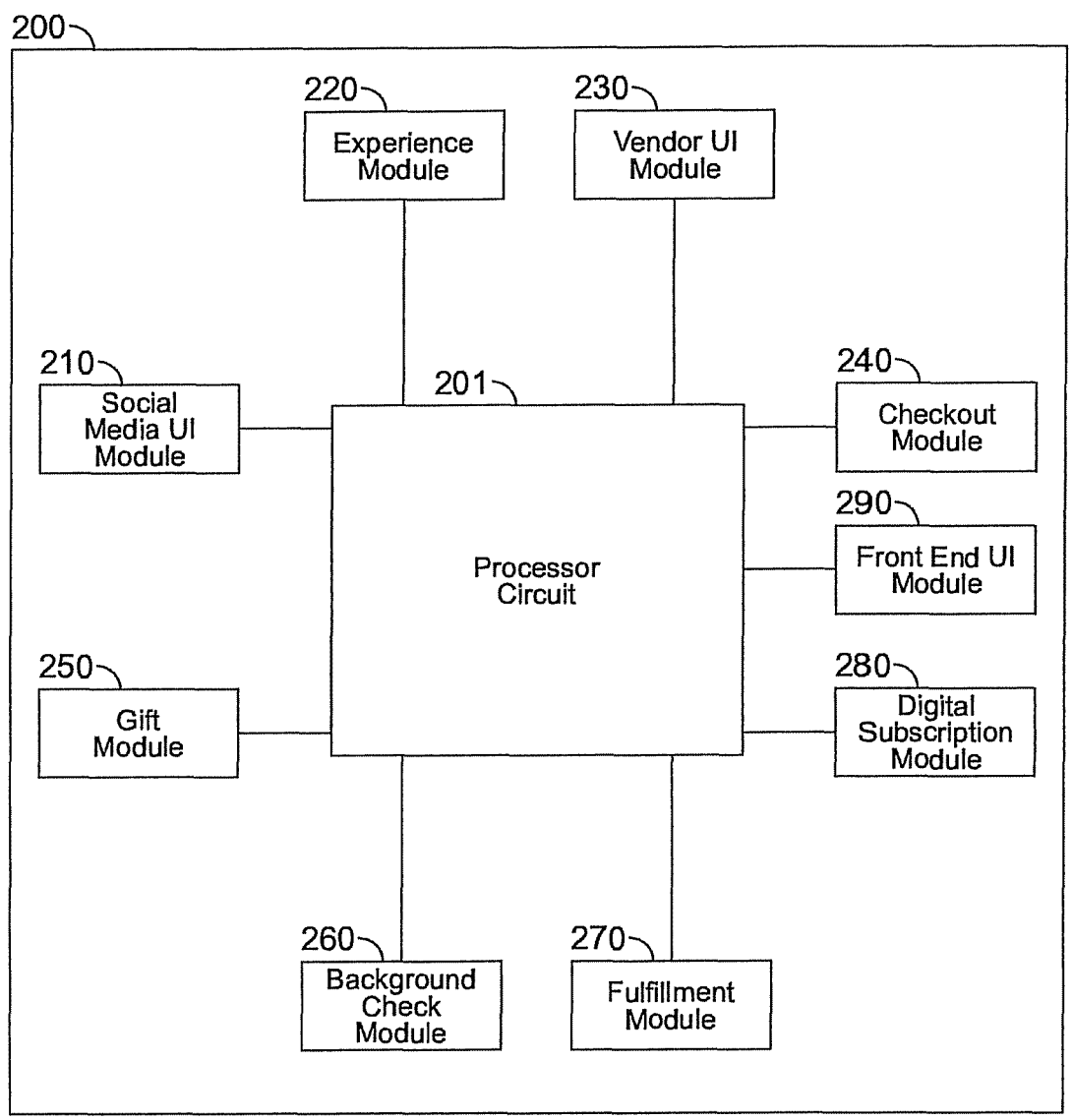
FIG. 2 is a block diagram depicting in greater detail an illustrative experience fulfillment system and interactions between components thereof, consistent with one or more aspects related to the innovations herein.

The experience fulfillment system 200 shown in FIGS. 1 and 2 is comprised of various components, which include but are not limited to a processor/circuit 201, social media UI module 210, experience module 220, vendor UI module 230, checkout module 240, gift module 250, background check module, fulfillment module 270, digital subscription module 280, and front end UI module 290. These components may be used to perform the processes described below in greater detail.

According to the features shown in FIG. 1 and described elsewhere herein, the present systems and methods may be configured with various inputs and outputs. For example, implementations may process information received from components associated with entities such as customers, fans, users, studios, companies, potential partners, talent/celebrities or their representatives. Other inputs and information processed therefrom may include data from payment related components, data regarding items for sale or auction, content coming in for submission, information associated with cloaking and/or security, and/or communications from anyone who wants access to the celebrity (e.g., brands, producer, charity, fans/users, etc).

After processing and/or transformation via the systems and methods herein, outputs as well as information or data regarding products and experiences coming out of the system may include experiences in both physical and digital form, one or more interfaces for celebrities which allow them to approve or decline transactions, personalized or customized content for fans/users, streaming services, and portals or components for the creation of in-house content, among other things.

With respect to systems and methods herein configured as platform-type arrangements, implementations may include or involve a social middleware, other data platform and/or related components. Here, for example, such implementations may be configurable as a social middleware that combines social media and online commerce. For example, a system may be configured as a stand-alone platform that integrates with other social media platforms, including features of focus and personalization keyed to the specific interests of a user set forth in the social media platform. Implementations may also be configured as a digital repository of opportunities for artists, athletes, and/or other notable figures, including features that assist these individuals in more fully utilizing their time and earning potential.

Further, connection between celebrities and the public may be configured with a cloaking service/technology that provides a measure of security and privacy for the celebrities. Such cloaking components may allow celebrities using the system to interact with fans/users via social platforms without having to reveal or compromise personal accounts or information. Systems herein may also serve as a trusted marketplace platform that lies between the celebrity and the fans/users.

The present system may also include a data platform that allows for information, online communication, and the exchange of opportunities between those using the platform, whether they be consumers, celebrities, charities, etc. Those opportunities may be syndicated and/or archived on their behalf, creating an idea bank that is accessible to multiple users.

As such, implementations are provided where platforms or marketplaces that resolve unfulfilled demand are accomplished and/or where celebrities achieve a reputation-preserving way to make money by selling content and experiences to fans/users. According to some embodiments, for example, systems and methods herein may resolve the underlying drawbacks via features of publicizing this opportunity over computer networks, registering and enrolling fans/users, collecting payments, and/or processing or delivering the content, opportunities and experiences on behalf of the celebrity.

Without the present systems and functionality, fans or users would typically receive filtered content not from the celebrity themselves but from the people or entities that represent them. The content that is sent out directly from a celebrity via their own social media accounts is usually sent to many sources at once and may lack an exclusivity that many fans crave. Also, agents and middlemen generally require a fee of their celebrity clients, whereas the present systems may fill gap in a celebrity's opportunity lineup without such middleman influences.

There are multiple illustrative scenarios wherein the platform may be used. Some of these include the promotion of events, charitable fundraisers, memorabilia sales, agents wanting to streamline the submission of opportunities to the celebrities they represent, and situations where celebrities wish to have direct control over opportunities without the need for a middleman, among other things.

Artists, athletes, and luminaries are accomplished people with time and attention that isn't fully utilized. Fame is an intangible asset, but fame has a marketplace value when attached to the time, activities, and memorabilia of a notable person. The systems and methods described herein provide a central way to monetize a celebrity brand and a platform for trading on their famous names for commerce other than via Hollywood-style agents and gatekeepers or other middlemen. The systems and methods described herein are also configured to provide alternative opportunities to celebrities than those that may be found by an agent or middlemen, who may be unable or unwilling to find every opportunity given their own workloads and commitments.

Furthermore, the systems and methods described herein can enable celebrities to sidestep the issue wherein an agent usually earns a percentage of a client's paycheck, even when the client finds and negotiates his or her own deals. Not every deal needs an agent and, sometimes, a fan might be a better source for certain types of opportunities. For example, a corporate CEO who is obsessed with baseball might want to invite star baseball players to appear at an event, but an agent might dismiss the request as not being worth the time. Yet, the retired player would have liked to take part in the opportunity.

Thus, this system can help celebrities or their representatives maximize smaller and/or alternate opportunities for local celebrities, such as local sports stars or regional TV personalities, this may be a significant method by which they can extend their income and connect with fans/users.

Figure 3:
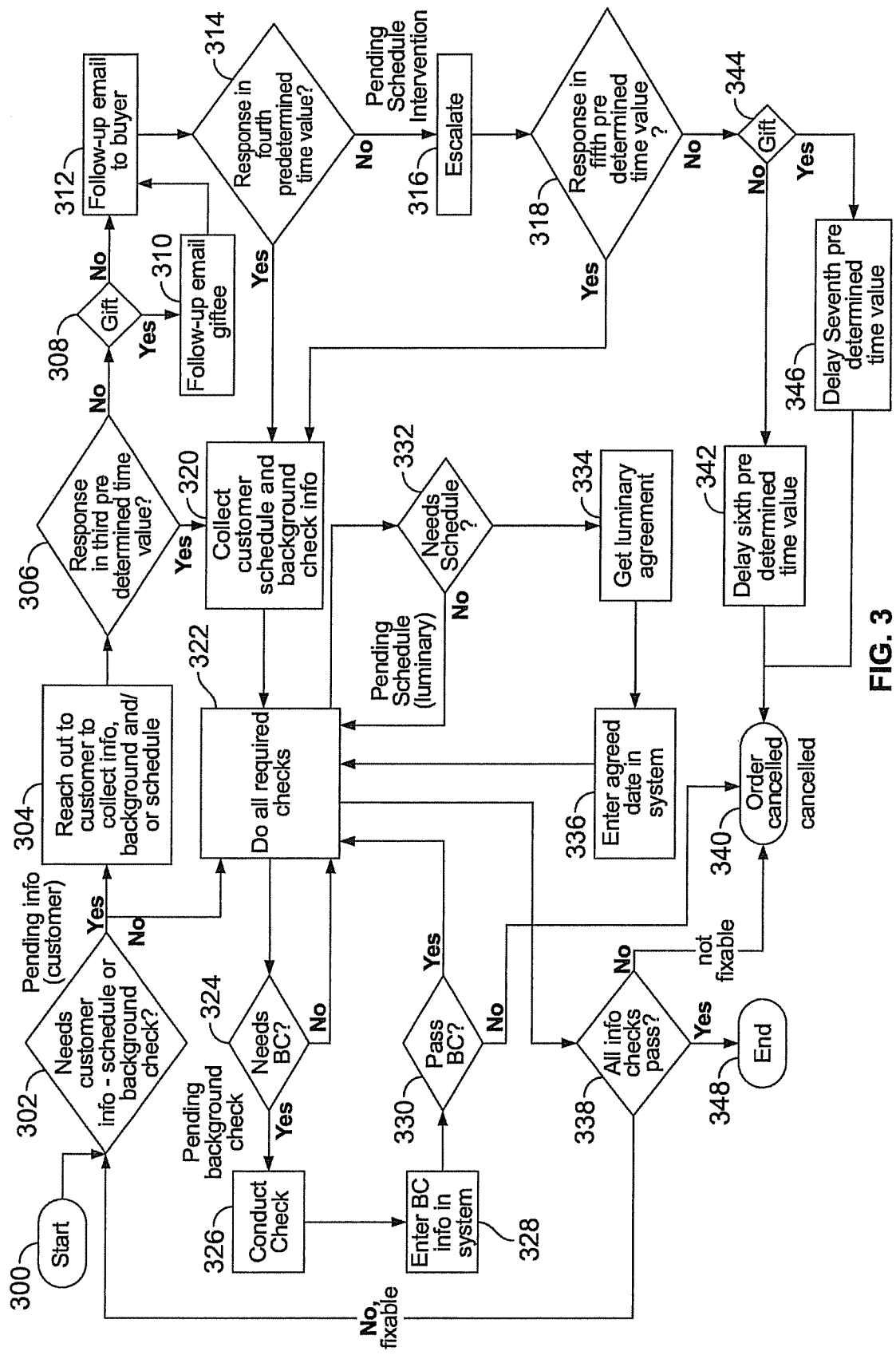
FIG. 3 is a flow chart depicting an example customer background check process consistent with one or more aspects related to the innovations herein.

FIG. 3 is a flow chart depicting an example customer background check process consistent with one or more aspects related to the innovations herein. This process may be performed by the processor circuit 201 and/or background check module 260 of the system 200. Systems and methods, here, may provide functionality that help monitor and maintain security for celebrities. Such celebrities may spend a great deal of money on physical security when they make personal appearances, but they cannot attend every event in person because not every event can be vetted. As such, these background/security implementations and tools may provide personalized interaction with fans/users while maintaining a layer of security and privacy.

Additionally, there may be a need for a fan to verify that an online celebrity, or their piece of memorabilia, is authentic. Authentication of items signed by notable people affects the value of the item, as well as the reputation of all involved in its sale. Furthermore, there are some challenges to the process of purchasing and consuming celebrity-related content. Consumers have an expectation that they can purchase content on-demand, however region-locking and release window technologies may impede this process, even if consumers will buy content legally when available, but will resort to pirating if not legally available.

Other example uses for this system may involve using Security APIs As a component of the system, such as implementations that include video/audio fingerprinting.

Further, systems and methods herein may involve various features related to security, according to some embodiments. For example, implementations may be configured to handle security problems in a multitude of ways, including watermarking, to ensure paywall integrity, and Digital Rights Management (DRM). Such security may be useful for celebrities to protect their online content and identities.

Methods here may also involve verification of the various opportunities, according to some embodiments. Here, implementations may be configured with features to protect the reputation of the celebrity and/or the authenticity of the good, service or offering, things that celebrities may be concerned about. Such system verification processes may ensure that opportunities for celebrities are legitimate, and backed by whom they assert they are backed. Functionality may also be provided to assure fans/users that the celebrity experience is authentic. Further, implementations may be configured with a ratings system for both fans/users and celebrities, to help provide measures of assurance for people on the platform, according to some embodiments. Such implementations may even incorporate information from other social media sites to make it more interactive.

Referring to the illustrative processing shown in FIG. 3, implementations here may first check to see if the products in this order require scheduling or a background check, at 302. If not, processing may proceed through steps 322 and 338, to the end 348, after which the system continues at step 912 in FIG. 9.

If scheduling or a background check is needed and hasn't already been accomplished, then processing may be performed to reach out to the customer to collect background information, at 304. Such processing may result in the initiation of various communications, such as emails, phone calls, and/or other methods or functionality. Further illustrative processing may be performed, at 306, if a response from the customer is not received within a third pre determined time value, such as 7 days for example. Here, if the item ordered is a gift 308, then implementations may follow up with an email to the giftee, at 310, as well as with an email to the buyer, at 312. Such communications may be optional and may serve as additional prompts to get the information needed to fulfill the experience item. Turning back to the illustrated processing, implementations may wait up to a fourth predetermined time value, such as 7 days for example, for a response, at 314. If no response is received, attempts to contact the customer and/or giftee may be escalated, at 316. Such escalation may include functionality in the form performing processing to initiate phone calls or other communications by a customer service/concierge component or individual. Again, implementations may wait a fifth predetermined time value set period such as 7 days for example, at 318, and, if a response is still not received, additional processing may be performed. For example, implementation may wait a sixth predetermined time value, such as 1 year for example, for a non-gift order 344/342, after which the order will be cancelled, at 340. For a gifted order, implementations may wait a seventh pre determined time value, for example almost indefinitely, for a response, at 346. Functions associated with gift processing may be performed by the processor circuit 201 and/or gift module 250 of the system 200.

If at any point in the process, a response is received from the customer, then the various information needed from the customer may be collected, at 320. If a background check is required, information may be collected from the customer, or from the giftee in case of a gift. If scheduling is required, information may be collected about the customer's or giftee's availability. Here, for example, implementations may be configured to collect at least 3 days and times that the customer is available. Once the needed information is collected from the customer, the system may access information regarding subsequent processing to be performed, at 322. For example, if scheduling is required 332, processing may be performed to contact the luminary/vendor to see if any of the dates and times that the customer is available match up with the availability of the luminary/vendor, at 334. Implementations may be configured such that the customer or giftee cannot just specify a time that they want the experience to happen, because the luminary/vendor must also be available for the experience to occur. If any of the times specified by the customer are acceptable to the luminary/vendor, then the agreed upon date and time is confirmed and processed by the system, at 336. If the luminary/vendor is not available at any of the times specified by the customer, then implementations may perform processing to allow the luminary/vendor to enter several dates and times into the system as to when the luminary/vendor is available, at 336.

If, at 324, a background check is required, then the background check processing/processes may be started at 326. This process may be performed by the processor circuit 201 and/or background check module 260 of the system 200. The results of the background check, once complete, may be entered into the system for processing, at 328. The system may then evaluate if scheduling/background check process had completed successfully, at 338. If the celebrity/vendor had not agreed with the customer available dates, but had specified alternatives, then the scheduling problem may be deemed fixable and the system loops back to contact the customer or giftee, this time communicating to the customer the alternative times that the vendor is available, as per step 302 and onward. It is possible that the customer and luminary/vendor cannot find a mutually agreeable time to schedule, in which case the order is canceled, at 340. If the background check fails outright, the order may also be cancelled 340. In some cases, a background check may end up in a marginal state, that needs further evaluation. In these cases, various processing may be performed as to how to proceed. In these marginal cases, processing might be performed to reach out to the customer again 338, 302, e.g. to gather additional information to help decide whether to accept or cancel the order. If all the checks pass successfully, the scheduling and background check processes are flagged as complete, at 348, and the process proceeds from step 908, in FIG. 9, to step 912.

Figure 4:
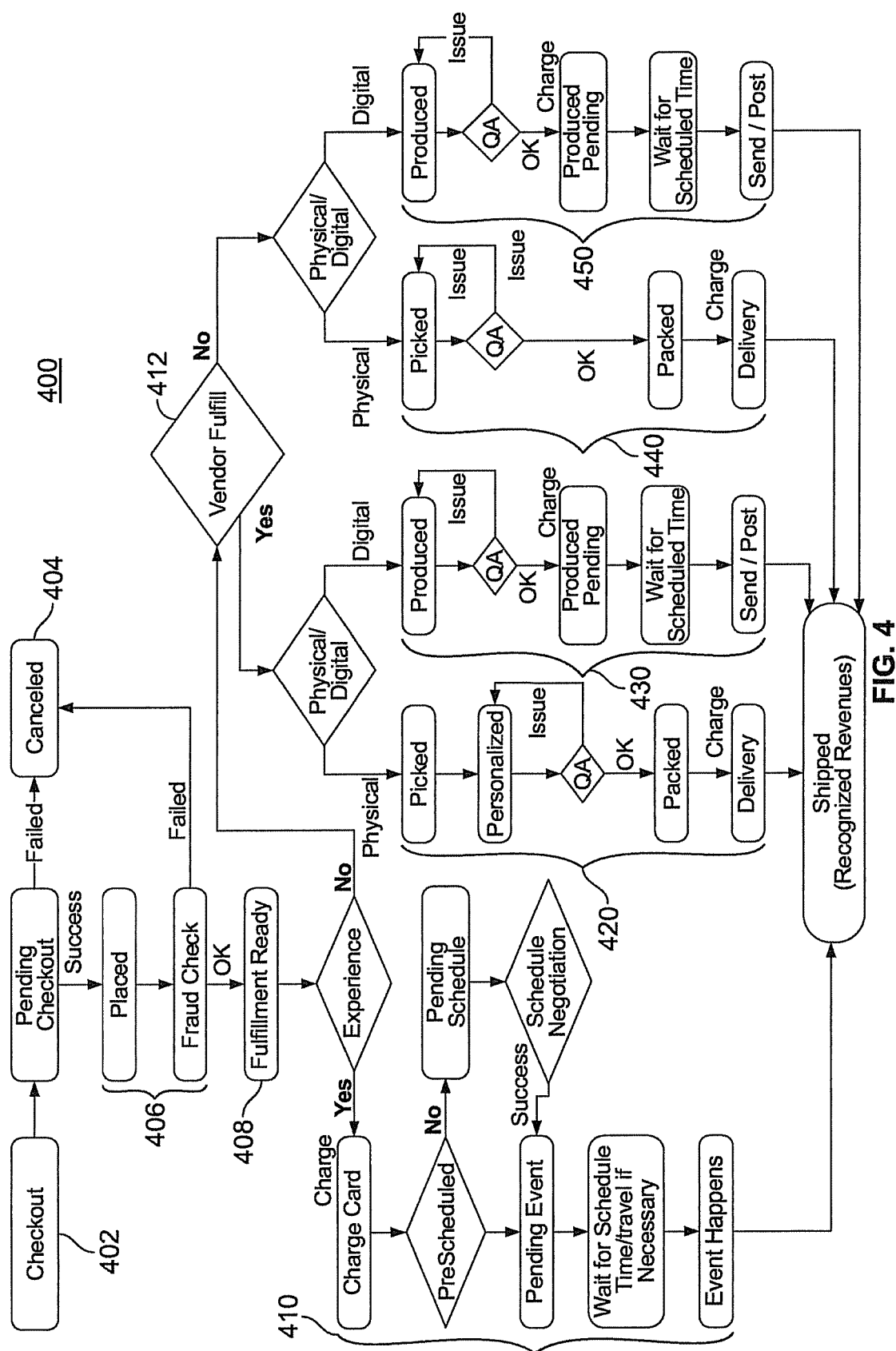
FIG. 4 is a flow diagram depicting an illustrative process of fulfillment architecture consistent with one or more aspects related to the innovations herein.

FIG. 4 is a flow chart depicting an illustrative process of fulfillment architecture consistent with one or more aspects related to the innovations herein. This process may be performed by the processor circuit 201 and/or fulfillment module 270 of the system 200. Through this system, fans/users gain access to exclusive content, experiences, and items directly through a celebrity's page, and this system provides a platform for fans/users to complete the transaction. This can include everything from finding what they want to purchase, arranging for shipping and billing, and finally paying to complete the transaction all in one centralized place.

Celebrities are looking for new, unimpeded ways to engage their fan base. Existing social media platforms, such as those on the Internet, are useful for broadcasting comments and promoting appearances, but are not conducive to interacting with fans/users in a potentially lucrative way.

Some traditional methods of engaging the fan base and press are also not popular with celebrities. For example, many celebrities dislike the press and find promotional tours exhausting. Currently, these media tours are the best and only way for celebrities to promote themselves as a brand. There are also not easy nor accessible ways to promote as well as actively sell that brand when a celebrity doesn't have an upcoming film or TV show that's worthy of a sponsored junket.

Another problem with fan engagement is that it involves one way fan solicitation of the celebrity. For example, fans/users may have to line up outside of theaters, send tweets, post social media messages, write fan mail and many other activities in the hope that the celebrity will pick them for an autograph, special connection on social media etc. As such, there is a need for systems and methods that offer more predictable options for fans/users willing to pay to ensure that they get the attention they crave. Implementations herein provide tools to supplement and enhance the fan interaction with celebrities with a greater degree of certainty.

Also, current methods of reaching fans/users are limiting for celebrities. Many don't know that they can provide a meaningful connection to fans/users via social media with minimal effort. Examples of under-utilized tools are video chat, email exchange, micro-blogging sites, etc. However, in the present implementations, especially when combined with cloaking devices, the privacy of celebrities can be protected while their direct interaction with fans/users increases.

There are many other problems with current celebrity marketing. For example, for celebrities who aren't as popular, or who have a niche level of fame, there are also very few good ways to make money off of that fame. For instance, there may a retired sports star might own some market-worthy memorabilia but that star may have had a relatively short athletic career, and may not even have an agent. This can make it hard to find and tap into their existing fan base. Currently, if the athlete wants to make money selling their memorabilia, he or she might participate in a convention attended by fans/users. However, that athlete may have more fans/users dispersed throughout the United States or the world, who aren't able to attend such a convention.

Implementations herein utilize online solutions that enable the celebrity to sell memorabilia online, and reach a wider audience than offline. But selling personal memorabilia on a website such as eBay may not be optimal, and does not necessarily enhance their personal brand or image. And because celebrities sometimes only sell to niche markets, and because they may not have the tools to reach a large number of people within that market, it's likely that they are not receiving market price for their time and/or memorabilia. Systems and methods herein may increase and help to set the income they receive from selling this memorabilia or making personal appearances by streamlining the sales process for celebrities, aiding in booking appearances and maintaining celebrity reputations.

The illustrative flowchart 400 regarding fulfillment architecture of FIG. 4 shows an example of how items can get fulfilled by the back end systems. The process of fulfillment may vary as a function of the type of product and the identity of the entity fulfilling the request. FIG. 4 also illustrates exemplary order status IDs that correspond to each step in the process. Also shown are credit charging steps. In the process, revenue is recognized when the item reaches the shipped step.

For example, each process begins with a checkout in 402. The checkout either fails, and is cancelled in 404, or succeeds and begins the fulfillment process. If the checkout succeeds, the order is placed and checked for fraud in 406. If the fraud check passes, the checkout proceeds to fulfillment ready stage in 408. If the fulfillment ready fails, the order is cancelled in 404. If the fulfillment is deemed ready, the order proceeds depending on whether the order was for an experience or another product.

If the order is for an experience, the process proceeds to charge the user in 410, for example by charging their credit card. Next, the prescheduled events proceed to pending events, whereas the non-prescheduled events proceed to a pending schedule and schedule negotiation until they are successfully schedules. After the pending event stage, the system waits for scheduled time/travel if necessary, and then the event happens. When the event has taken place, revenue may be recognized.

If the order is not for an experience, a determination may be made as to whether the vendor is to fulfill the order or not in 412. If the vendor is to fulfill the order, the next determination is whether the order is for a physical or digital goods.

If the order is for physical goods, the goods are picked and personalized in 420. If there is an issue in personalization (e.g., an order cannot be personalized as specified), the order goes back to the picked step until the order is correct and ready to proceed. A quality assurance (QA) evaluation is performed, and after QA approval, the physical goods are packed. Then the order price is charged and the carrier ships the goods. Finally, the shipped goods trigger the system to recognize revenue.

If the goods are digital, the digital goods are produced in 430, and then a QA check may be performed on them. If there is an issue, the digital goods are produced again and QA checks again until the order is correct. Once QA approval is obtained, a charge can be issued for payment. A produced pending stage may follow until a period to wait for scheduled delivery time elapses. After this time, the order is sent or posted. Finally, the shipped goods trigger the system to recognize revenue.

If the goods to be shipped are not vendor fulfilled in 412, and the goods are physical, the goods are picked in 440. A QA evaluation may also be performed, and if there is an issue, the goods are picked again until QA approves. After QA approval, the physical goods are packed. Then the order price is charged and the carrier ships the goods. Finally, the shipped goods trigger the system to recognize revenue.

If the goods to be shipped are not vendor fulfilled in 412, and the goods are digital, then the digital goods are produced in 450 and checked by QA. If there is an issue, the digital goods are produced again until QA approves. Next, if the QA approves, the charges are applied. The produced goods are then pending and may have to wait for a scheduled time to send/post the goods. Finally, the shipped goods trigger the system to recognize revenue.

As such, systems and methods herein provide transactions and monetization for celebrities by providing payment and collection services. The fulfillment platform, with certain illustrative functionality shown in FIG. 4, allows for order fulfillment for a variety of scenarios including, but not limited to, single orders or large group purchases such as a group of friends joining together to purchase a private concert. For a vendor or celebrity using this system, money paid for their services can be available immediately via a dashboard interface.

Systems and methods herein may also include different levels of access for users, according to some implementations. Exemplary levels may include a fee-based subscription, a set of privileges earned by actions tracked on the site, and various combinations of the two. Between levels of free membership and all-access paid membership, there may be intermediate levels of membership with varying subscription rates, and corresponding access to information and opportunities for the fan, according to some embodiments.

Other aspects of systems and methods herein may include transactional sharing. Implementations may also allow for multiple types of content sharing and transactions. These include, but are not limited to, the selling of memorabilia and the use of digital/online souvenirs as a receipt and keepsake for individual people such as fans/users, celebrities, donors and collectors, as well as organizations such as studios, non-profits, companies, brands, and sports teams including players and owners.

Transactions performed via the platforms herein may include pay-for-content/privileges features and implementations. Among other things, systems and methods involving pay-for-content/privileges functionality may serve as a publishing platform, aggregation tool, and/or distribution channel enabling celebrities to offer exclusive content and a first-look rights on special offers to fans/users for a fee. For example, fans/users may subscribe to a famous theme or endeavor channel (e.g., chefs channel) in order to view a weekly live point-of-view broadcast of the activity or event of interest (e.g., chef cooking a particular dish). Other exemplary implementations may include fans or users subscribing to another channel, such as a famous snowboarder's channel, in order to access an exclusive archive of trick tips and to have the opportunity to buy VIP passes and/or meet-and-greets with the celebrity before they are made available through other channels.

Systems and methods herein may utilize a central computer based graphical user interface dashboard that can inform the fan/subscriber of updated digital media content and prices, according to some embodiments. Certain personalized options, for example, may include use of celebrity video, including video shot by the celebrity, and/or augmented reality digital content. Such content may include point-of-view footage.

In some configurations, this content is made exclusive in order to be sold to fans or users via a number of different pricing mechanisms. Illustrative pricing mechanisms include, but are not limited by the following examples:

Freemium: non-paying fans/users will still be able to access small excerpts of celebrity content, and a limited selection of lo-resolution photos; while for a fee based subscription, fans/users are able to access more premium, exclusive content including invitations to special events and high resolution photos.

Bundle pricing: fans/users are able to choose any number of celebrities to receive exclusive content from for one price. For example, the fan may like to follow action stars, such as Arnold Schwarzenegger, whose subscription to their exclusive content runs for $19.99/month, for example, but they may get themselves a deal by purchasing access to exclusive content for Arnold Schwarzenegger, Tom Cruise and Vin Diesel together for $49.99, for example. Such bundling may also be utilized, e.g., for a fan that wants exclusive access to 8 bands but wants a deal for bundling them together rather than paying for access to each one individually.

Pay-per-view: a subscribed fan may have access to a certain tier of personal celebrity videos from which they may choose for a price; additionally, a fan can buy a subscription for a certain celebrity's content, which would then enable them to see a given amount of that celebrity's videos, music or other content.

Premiercast: the present systems and methods may provide fans/users the opportunity to receive what is referred to herein as Premiercast, a high-concept broadcast feed direct from their celebrity, which they will self-select for free via their membership. One example of such broadcasting might include a personalized message from a celebrity, featuring his or her message recorded just yesterday from on the set, etc.

By means of such fulfillment/architecture features in conjunction with innovative information processing herein, systems and methods herein provide fans/users and celebrities with improved ways to connect. For example, a fan/consumer can use the platform to verify celebrity presence and participation on the site. Another example may be the ability to unite with other platform-based fans/users to create group offerings for a celebrity, such as asking Jennifer Lopez to perform at a local party. Still another example may be ensuring that requests for charity performances are actually delivered, or ensuring that donated moneys are funneled to the right charity personnel. Further implementations may process transactions like arranging events such as a meet and greet, having dinner with a celebrity for charity, sending a 280-character message of inspiration (or other message) to a celebrity, ordering a birthday voice mail message for one's mom from a favorite comedienne, purchasing digital souvenirs which include an authenticated seal such as a digital coin which lets others know a user has had a certain celebrity experience, purchasing a note or a tag from a celebrity for one's social media profile or site, participating in a call or lesson with a hero and commemorating it on a social media site, receiving a personalized video greeting from a celebrity, having a music lesson from a favorite celebrity, playing an online game with a celebrity, providing more niche or local offerings to local celebs such as local chefs or sports stars, having celebrities work on projects that are market-specific, generate reports and analytics for celebrities about certain markets, voting on a celebrity and their reputation via a ratings system, and participating in a virtual town hall meeting.

Properly handling and processing information to achieve improved reputation management functionality relates to other facets of the system, according to some embodiments. Given that a celebrity's reputation is directly linked to his/her personal brand, reputation management tools are another resource that agents and public relations personnel may find useful. One of these tools may be the platform's ratings system, where fans/users may rate others that they have interacted with, as linked to a variety of online services. Indeed, such functionality provides a social incentive for behaving and delivering on promised goods and services. Systems herein may also be configured to preclude celebrities from interacting with a fan who has a poor online reputation.

Another reputational element included in some implementations of the platform's functionality is turning the system into a game-like environment. Such systems may include game-like incentives such as points, medals, trophies, coins and progressive levels to reward users for engaging with the site and to keep fans/users returning to interact with those they want to, on the system platform. These incentives may also be displayed on a profile page so fans see which other fans are interacting with which celebrities and to garner a competitive urge to collect more incentives.

Charitable giving may also be an aspect of the system platform, according to some embodiments. Many celebrities have charitable causes with which they are connected. The charities and the celebrities that support them are always looking for ways to increase awareness and donations. Here, implementations may be configured to allow fans/users to connect directly to their favorite star's charity in real time, or near real-time. Further, a suggestion engine may be utilized to promote offers to specific users, depending on their chosen interests. For example, a fan who loves Betty White, a noted animal activist, might receive a message from Ms. White asking for donations to her favorite shelter. In exchange the fan might receive a digital souvenir commemorating the gift such as a thank you email, from Betty White. The system platform may handle the payment exchange, and support new projects or charitable causes from Ms. White. Further, charitable opportunities may be directly submitted to celebrities or their representatives and digitally archived, so that celebrities can access this info at any given time.

In another example, present celebrity auctions typically only reach a limited number of off-line fans. However, there may be many more people around the world who would bid on the item when given the opportunity consistent with the innovations herein, such as via the present network, web and/or online functionality. Thus, currently, such items rarely receive full market value bids. Charities may use such opportunity with implementations herein to become more visible regarding their auction items, to maximize the time and the attention of the celebrity supporter. This functionality is particularly helpful to smaller charities that do not have large brand names, but still want the support of celebrities to endorse their brand, and raise awareness and donations.

Another problem for charitable organizations is that they can miss out on donated celebrity items in situations where the celebrity must donate 100% of the item/experience or nothing at all. Such limitation excludes celebrities and offerings where the celebrity would be willing to donate a material percentage of proceeds but still wants to make some money for their effort. Implementations herein are configured to provide customized relationships of this nature, and via these implementations: (1) celebrities are provided functionality to customize their opportunities, and (2) more charities receive more attention.

Additionally, celebrities often want to start their own foundations, but need help with the administrative aspects of running a charity. This system may host an umbrella organization that oversees and administers the charity on behalf of a celebrity. For instance, someone might be able to donate to System.org/EvaLongoria Foundation. Here, then, the present implementations may be used to handle the financial transactions of such a non-profit project.

This system may also be used as a vehicle for charities to fundraise and drive traffic. These can be rated in an online rating systems as well. In addition, any non-profits need a consistent cash flow because they may only have a few big fundraisers per year, thus making their cash flow uneven. Non-profits also need general funds for operations. Implementations herein may also be used as a source for funding general administrative and overhead costs, or similar aspects for which it is often difficult to raise money.

Additionally, charities face challenges regarding distribution. They may have an email list and regular supporters, but if they have a celebrity item to auction off on a visible site, they may be able to reach a much wider audience in order to maximize bidding.

Systems and methods herein may also archive offers or fan-based ideas for celebrity performances or work, including a timeline. Implementations herein may be configured to utilize these to provide more niche offerings to local and regional fans/users. Also to offer market tools for agents and managers. Additionally, as discussed above, to enable charities to smooth out their funding year-round, and stay visible. Implementations may offer celebrities and their teams an interface such as a control panel enabling them to post offerings for sale, get alerts for tasks required to fulfill sales, respond to offers, and track the status of their listings. This system can add real-time scheduling, delivery and inventory to transactions for celebrities.

Figure 5:
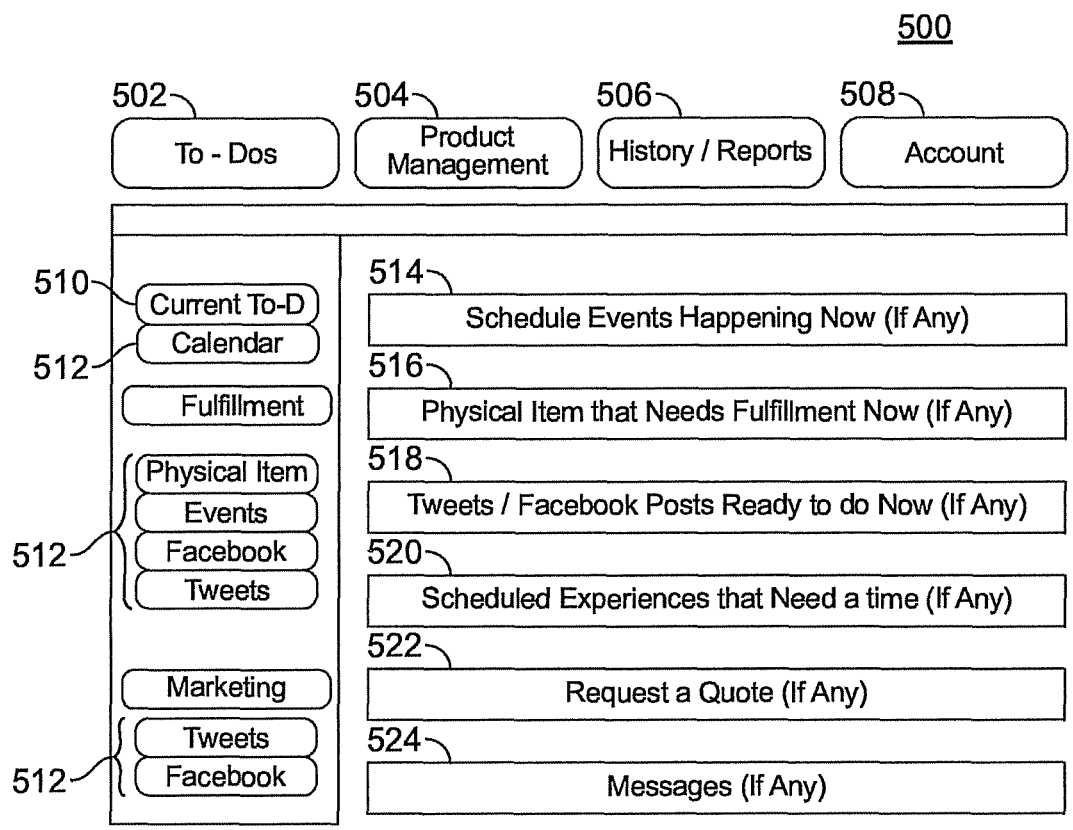
FIG. 5 is an illustration of an example administrative graphical user interface consistent with one or more aspects related to the innovations herein.

FIG. 5 is an illustration of an example administrative graphical user interface consistent with one or more aspects related to the innovations herein. Referring to FIG. 5, a map of an illustrative Graphical User Interface (GUI) of exemplary vendor administration functionality is shown. For example, the vendor/admin GUI may be generated and/or processed by the processor circuit 201 and/or vendor UI module 230 of system 200. The vendor UI module 230 may communicate with the vendor processor/fulfillment component 105 to cause the vendor processor/fulfillment component 105 to display the vendor/admin GUI and/or receive commands from a user. In the illustrative GUI depicted, a 'to-do' button 502 may display what the vendor needs to do now. The 'to-dos' 502/'current to-dos' 510 may be the first screen that shows up when the vendor logs in. In some implementations, only items that need to be done and can be done now show up on this screen. Items may be sorted by priority. Each item type has a custom UI that explains to the vendor the next steps.

The GUI 500 may include a product management button 504, a history/reports button 506 an account button 508, and a calendar button 512. A list of notifications may also be displayed, for example including display for the scheduled events happening now section 514, the physical items that need fulfillment now 516, Tweets/Facebook posts 518, the scheduled experiences that need a time section 520, the request a quote section 522, and a messages section 524. The GUI may also include a fulfillment section 530 and a marketing section 540. The fulfillment section 530 may include physical items, events, Facebook, and Tweets sections. The marketing section 540 may include Tweets and Facebook sections.

Some examples of the ways a celebrity may use the platform include allowing a direct conduit to a celebrity for any individual or entity, such as a fan or a movie studio or a partner that wants to provide them with work or a project, using virtual opportunities to connect with fans/users on social media, and/or enabling a celebrity to better manage their appointments and career opportunities. With this system, they are able to do as much or as little offered work as they like. They are also able to search for types of projects which may be offered.

Additionally, celebrities may manage their own career remuneration without paying fees to a middleman. They are also safer in their personal interactions with fans/users, due to cloaking mechanisms. They may offer content directly to a celebrity's fan base, thereby bypassing middlemen and distribution channels and effecting a grass-roots sales effort. An example might be a band's pre-selling an album to dedicated listeners or fans. Celebrities may take digital control of tracking, publication, and distribution of anything to do with a celebrity's name or brand. They may publish celebrity content such as direct certain photos, post on update on a social media site, and share a positive movie review. Systems and methods are configured such that celebrities may steer multiple sites from one control panel and streamline the publicity process. Implementations may be configured to deliver a wish list to fans/users or thank you notes to those with whom they have interacted. Celebrities may be provided functionality enabling them to donate all or some of the proceeds of a certain concert to charity, and the giving process can be automated. Systems may also be configured to ensure that charity moneys, based on appearances, are delegated to the right personnel, thereby reducing risk of scandal and misappropriation.

As celebrities sometimes have resources at their disposal, this system can also feature anyone including lesser known celebrities, which can flatten out the industry's payment curve by enabling many celebrities to better find their sales niche. It may also allow fans/users through the middlemen gatekeepers. Systems and methods herein may initially leverage other people's content and then create their own content. They may also be configured to create and/or involve a pay-wall service within an already premium channel.

This system may offer curated and targeted distribution for exclusive content, according to some embodiments, for example via the GUI. In some cases this system may offer its own publishing tools. In other cases it may enable celebrities to use existing publishing platforms and tools such as YouTube and Flickr with additional paywall features provided by this system. For instance, the celebrity publishes a video on YouTube but adjusts the videos setting so it is only viewable to paying members of their channel on the present platform. Systems and methods herein may be configured to do this by marking a celebrity video as private, and embed it behind a paywall, then automatically generate messages to fans/users, who will be enabled to pick their "social circle" of friends or other fans/users who can pay for this content.

The scarcity of celebrity digital media content can makes it more valuable and exclusive thus helping maximizing the potential for more monetization opportunities. This system can provide the ability of certain limitations to a given celebrity's digital media content by either offering it for a limited time, or by limiting the number of people who can download or purchase it. Also as an example, a subscription to certain content can be limited to a fan/user's Facebook friends, a select ten of whom can be invited to purchase it—such content might be a video, a piece of music, an invitation to a meet-up online or special event or other forms of exclusive content.

The present content distribution functionality may enable content to be available world-wide over a wide area network such as the internet. To this effect, this system can create niche site areas for international celebrities, as well as U.S.-based ones.

Systems and methods herein may leverage existing publishing platforms and can publish exclusive content. Fans/users can self-select for free on this system's publishing platforms, based on their personal "opt in" subscriptions. These include, but are not limited to, social networking sites such as Facebook, Twitter, Tumblr, Wordpress, YouTube, Pinterest, Instagram, Vimeo, and any other publishing platform and each will notify a fan when their chosen celebrity publishes something. The user/celebrities can select published content as "Private," while they embed or Share their content with this system's platform.

Celebrities can aggregate their exclusive content and create bundles—for example, $19.95 for three celebrity videos, $29.95 for five. A free preview of the content can be included on the celebrity's pages.

Systems and methods herein may also provide celebrities with social metrics, which will help them know and cultivate their fan bases, according to some embodiments. Implementations of this system also provide celebrities with tools to develop their brand and offer exclusive access to content whether it be for free or for a premium subscription model. As systems herein are well-suited for power fans, celebrities may be provided with functionality to involve their fans in obtaining input from them to help determine who will go on tour with them, or who should co-star in a movie with them, as in prizes or contests, for example. Further, systems may give power fans first access to celebrity live performance tickets, as a way to create a continually meaningful connection, and an important, continuous feedback loop for celebrities, according to some embodiments.

Many options may be utilized to connect with fans. Some of those options include social networking websites such as Facebook, for example. Systems and methods herein may be innovatively utilized with such social networking sites, e.g., by using the Facebook canvas as an iFrame by having a DRM player inside of an API component of the system.

Third Party Integration

The system platform may be configured as a stand-alone site, and/or it can also integrate with third party social network websites and mobile applications. These configurations allow establishment of user preferences, such as identifying a user's top celebrity idols or using the site's recommendation engine to maximize fan engagement. The recommendation engine may also integrate information from third parties and suggest items or donations that a fan is able to purchase or make from a celebrity wish list.

Figure 6:
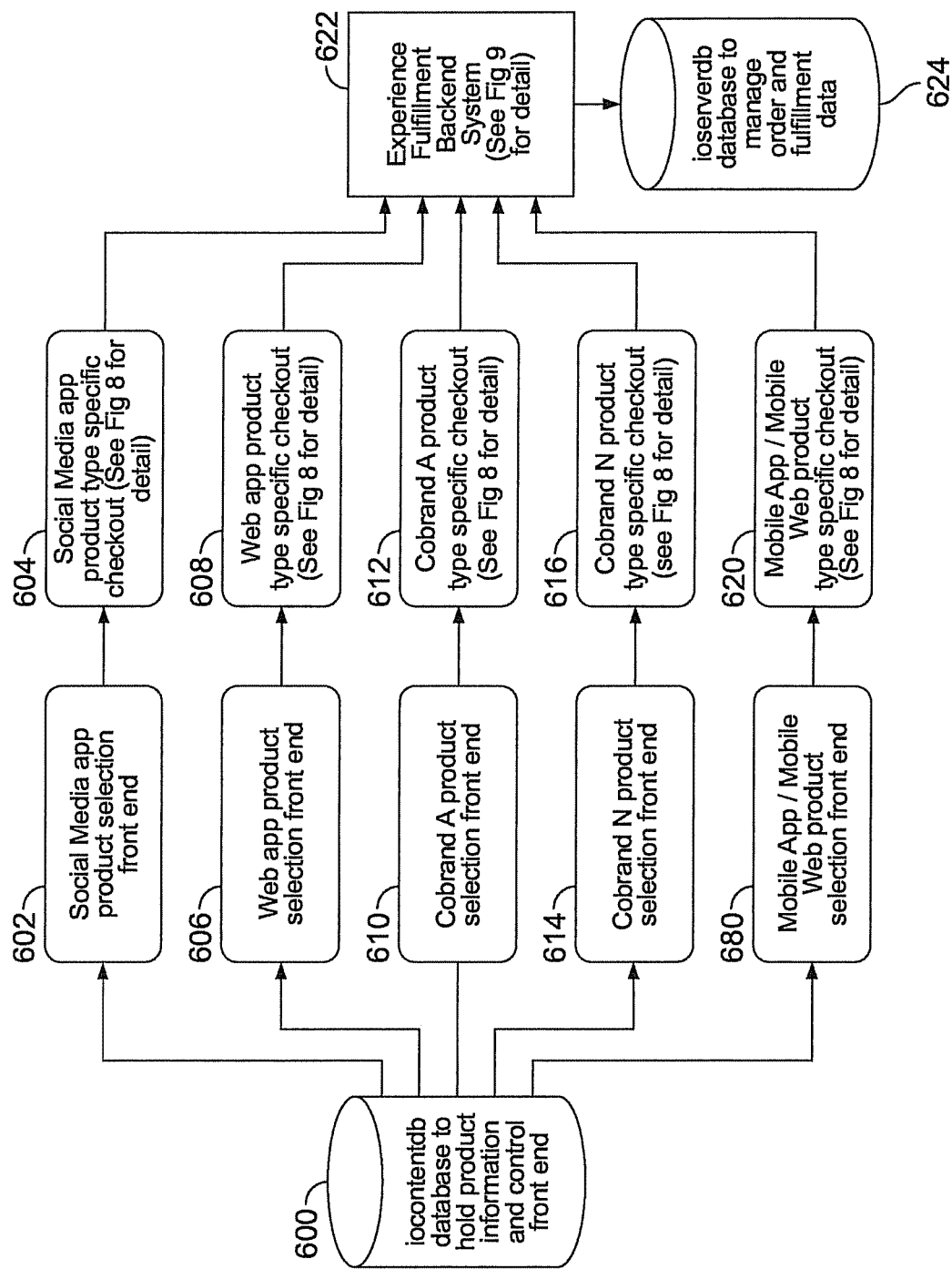
FIG. 6 is a block diagram depicting interactions among the elements of the systems consistent with one or more aspects related to the innovations herein.
Figure 7:
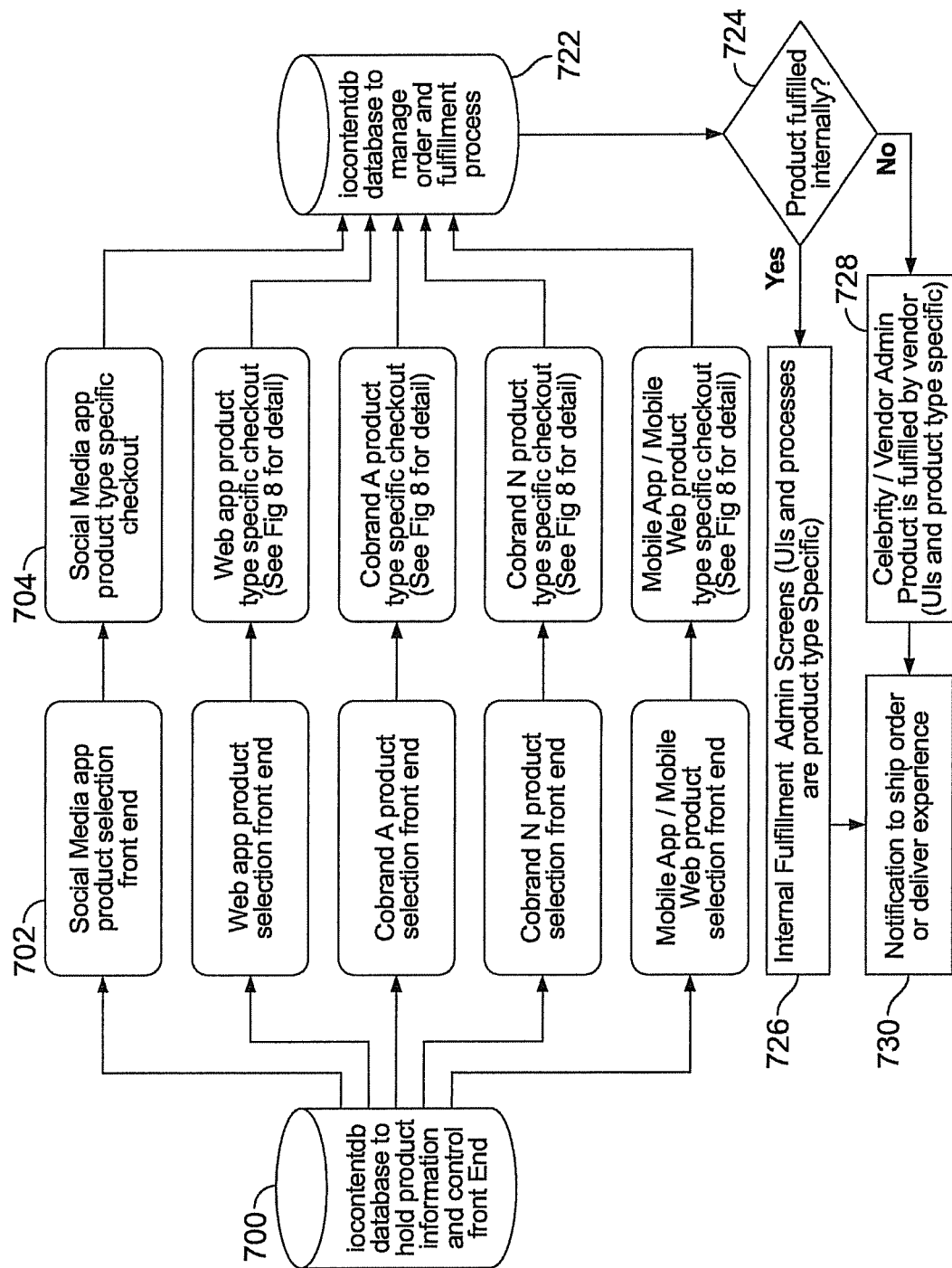
FIG. 7 is another block diagram depicting further interactions among the elements of the systems consistent with one or more aspects related to the innovations herein.

FIG. 6 is a block diagram depicting interactions among the elements of the systems consistent with one or more aspects related to the innovations herein. FIG. 7 is a diagram showing how the system may integrate with other platforms, including fulfillment and payment features. As shown, the fan or user may utilize a front end user facing interface provided by one or more third parties and/or this system itself. The product type checkout may occur either through this system or the third party system. The back end system may include the experience fulfillment components and a database to store the payment and fulfillment details.

The system connection platform may be a stand-alone website, a social networking site app, or an interface to other third-party social media platforms. Other implementations may be applications such as an HTML 5 application, which would provide access to the platform for those who are not able to download, and have no access to the application.

FIG. 6 provides a high level overview of some illustrative functionality and architecture of an exemplary system. Product information may be stored in a first database 600 configured to hold product information and control the front end. This data can be displayed in a variety of one or more front end components which can be controlled by the first database 600. Exemplary front end components and their check out modules may be different websites 602, 604, 606, 608, co-branded components/websites 610, 612, 614, 616, and/or front end may include one or more mobile apps components 618, 620. Each front end can include a product selection UI, through which a user may view and/or select products 602, 606, 610, 614, 618. Each front end can also display UI screens and fields to collect customer information specific to the many product types offered 604, 608, 612,

616, 620. Order data along with fulfillment information can be received via the front end UI by the backend system 622 and can be stored in a second database 624 configured to manage order and fulfillment data.

FIG. 7 is another block diagram depicting further interactions among the elements of the systems consistent with one or more aspects related to the innovations herein. As with FIG. 6, a first database 700 may contain product information and may provide the product information for processing and use by the front end components. Product selection UI front end components can display product information and receive product selections in 702, 706, 710, 714, 718. Users can view, select, and choose to purchase products, and the front end can receive customer information related to a purchase in 704, 708, 712, 716, 720. The second database 722 and backend system can receive the customer information via the front end and manage the order and fulfillment process, at 722. Once an order is placed, it may be determined whether it is to be fulfilled internally, at 724. If so, the order may be handled by an internal fulfillment process powered by internal admin UI 726. If not, the order may be handled by celebrities/vendors who use the vendor admin UI, at 728, which coordinates what things the vendor needs to do to fulfill customer orders and when they should be done. As with the customer front end screens which are customized based on the product type and other product information, the backend systems can process information differently as a function of the type of product being purchased. After fulfillment has been processed in 728, a notification 730 is issued to ship the order or deliver the experience.

System Processing and Navigation

Figure 8:
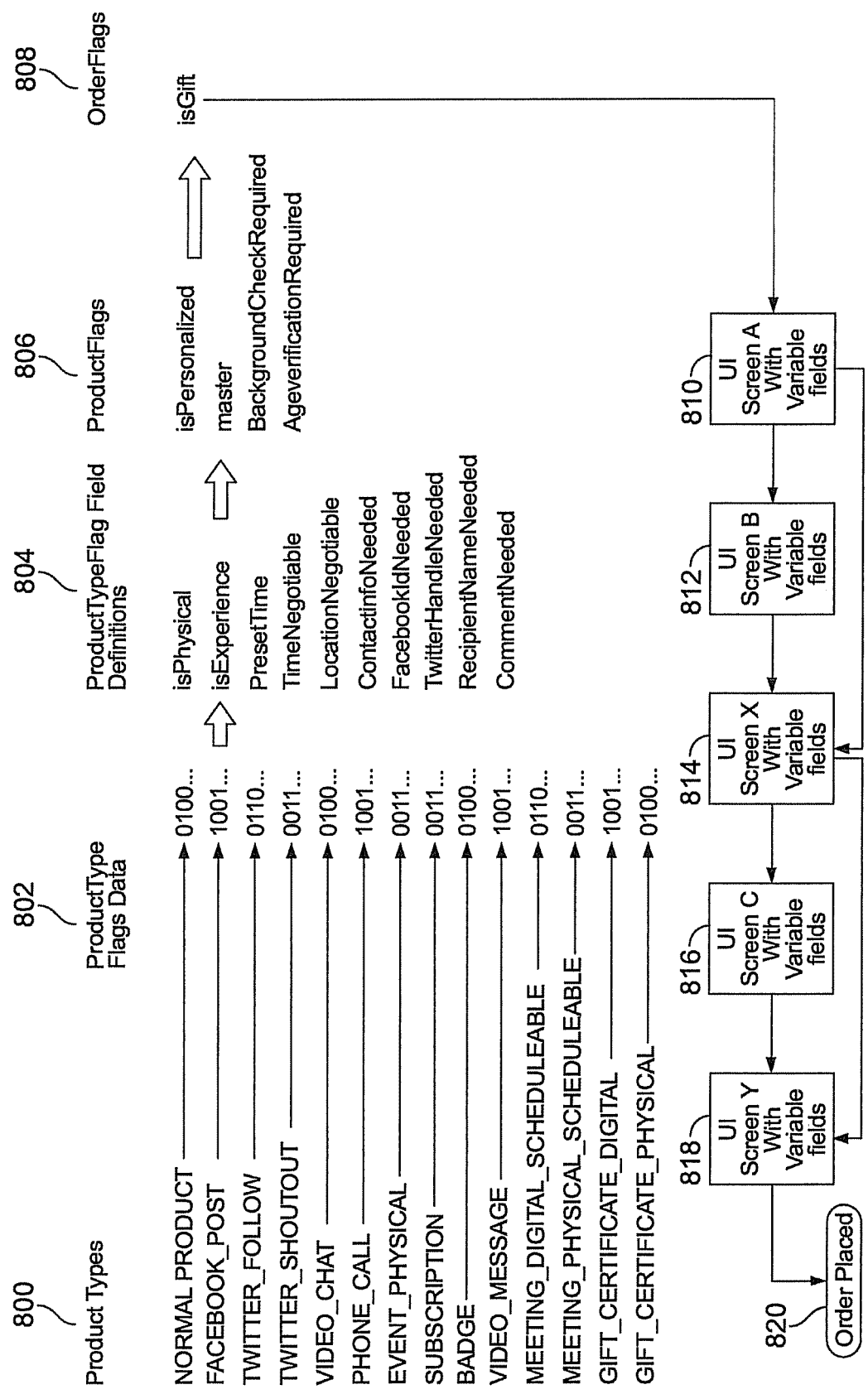
FIG. 8 is an example chart showing process flow of some of the system elements consistent with one or more aspects related to the innovations herein.

FIG. 8 is a flow diagram showing how selection of product types and product type flags may drive the presentation of the user interface screens for ordering, selection, and payment, consistent with certain implementations herein. These selections can also control the back end functionality required for product fulfillment. The architecture allows new product types to be created without code changes. Many product types, including types that are new to ecommerce/software, are supported. Each product type has a unique set of fields and UI screens for a user to complete. Examples of product types may include the following types. A 'Product Physical' or 'Normal Product' is a normal physical product (such as a product which may be sold via conventional e-commerce systems). A 'Facebook Post' is a Facebook post from a celebrity or vendor which can be purchased. A 'Twitter Follow' is a Twitter follow from a celebrity/vendor which can be purchased. A 'Twitter Shout Out' is a Twitter shout out from a celebrity/vendor which can be purchased. A 'Chat Video' is an online video chat with a celebrity/vendor which can be purchased. A 'Chat Phone Call' is a phone chat with a celebrity/vendor which can be purchased. An 'Event Physical' is access to an event from a celebrity/vendor that takes place at a preset place and time which can be purchased. A 'Subscription' is subscription access to periodic content from a celebrity/vendor which can be purchased. A 'Badge' is a customized badge from a celebrity/vendor which can be purchased. An 'Event Preannounce List' is a special experience from a celebrity/vendor which can be purchased and may be selected from a list of events. For example, a meet-and-great with the celebrity/vendor at any one of the concerts in a musician's concert tour may be a product in this category. A 'Message Video' is a custom video message from a celebrity/vendor which can be purchased. A 'Meeting Schedulable Digital' is a digital meeting with the celebrity/vendor which can be purchased and which may have a time that is negotiated between the buyer and the celebrity/vendor. A 'Meeting Schedulable Physical is a physical meeting with the celebrity/vendor which can be purchased and which may have a time that is negotiated between the buyer and the celebrity/vendor. A 'Gift Certificate Digital' is a gift certificate for a digital product or experience such as those described above, and a 'Gift Certificate Physical' is a gift certificate for a physical product or experience such as those described above.

A product types table 800, which has a record for each product type, may be included in the system. Implementations herein may utilize UI element features that present different UI fields and UI screens based on the product type of each product. Each product type in the table 800 includes product type flag data 802 which can be used to identify the product types within the system. Here, for example, various implementations and functionality may be achieved by performing processing as a function of data fields which represent the product type flags 802 in the data records/fields of the product types table 800. Also, product type flag field definitions 804 may be provided to define certain characteristics of each product type. For example, product types may be defined as 'isPhysical' or 'isExperience', indicating whether the product is a physical product or an experience, respectively. Product types may be defined as having a 'PresetTime' or 'TimeNegotiable', indicating whether the product (e.g., an experience) has a set time or has a time that can be agreed upon between the buyer and the celebrity/vendor. Product types may be defined as 'LocationNegotiable', indicating whether the product (e.g., an experience) has a location that can be agreed upon between the buyer and the celebrity/vendor. Product types may also be defined as 'ContactInfoNeeded', 'FacebookIdNeeded', 'TwitterHandleNeeded', 'RecipientNameNeeded', and/or 'CommentNeeded', indicating whether certain information such as contact, Facebook, Twitter, name, or comment information is required from the buyer in order to complete the product transaction. One example involving a SQL realization of product types table functionality is set forth in Appendix A.

In addition, other customization functionality may be controlled by product flags 806 in the product types table 800 for each product. For example, an 'isPersonalized' flag may indicate that the product is personalized to the buyer. 'BackgroundCheckRequired' and/or 'AgeVerificationRequired' flags may indicate that additional information about the user (i.e., a background check or an age verification) is required to complete the product transaction. In addition, further customization functionality may be driven by the order flags fields 808, which are fields specific to each individual purchase of a product. For example, an 'isGift' flag may indicate that the product was purchased by the buyer as a gift for another party. One example involving the flags in the product types table is set forth in Appendix B.

When a product types table 800 has been generated, including some or all of the data described above, it can be used in ordering celebrity products. For example, the product checkout screens described in the context of FIG. 7 above can present a variety of UI screens to a user. Note that the following sequence is an example only, as other sequences of UI screens consistent with the innovations herein may be displayed to a user in the process of placing an order; UI screens may be option or required. In the example of FIG. 8, a UI screen A with variable fields is presented in 810. This screen presents options for a user to select, such as the type of product to be purchased. Depending on which options are selected, the system can present another optional UI screen B in 812 or a required UI screen X in 814. For example, screen B can present optional fields associated with the choice received via screen A. Once the fields in screen B have been entered, the system can proceed to the required UI screen X in 814. Likewise, depending on what is received via screen X, the system can display optional UI screen C 816 or required UI screen Y 818. After all required fields (and/or optional fields) have been displayed and data has been received, the order is placed in 820.

Figure 9:
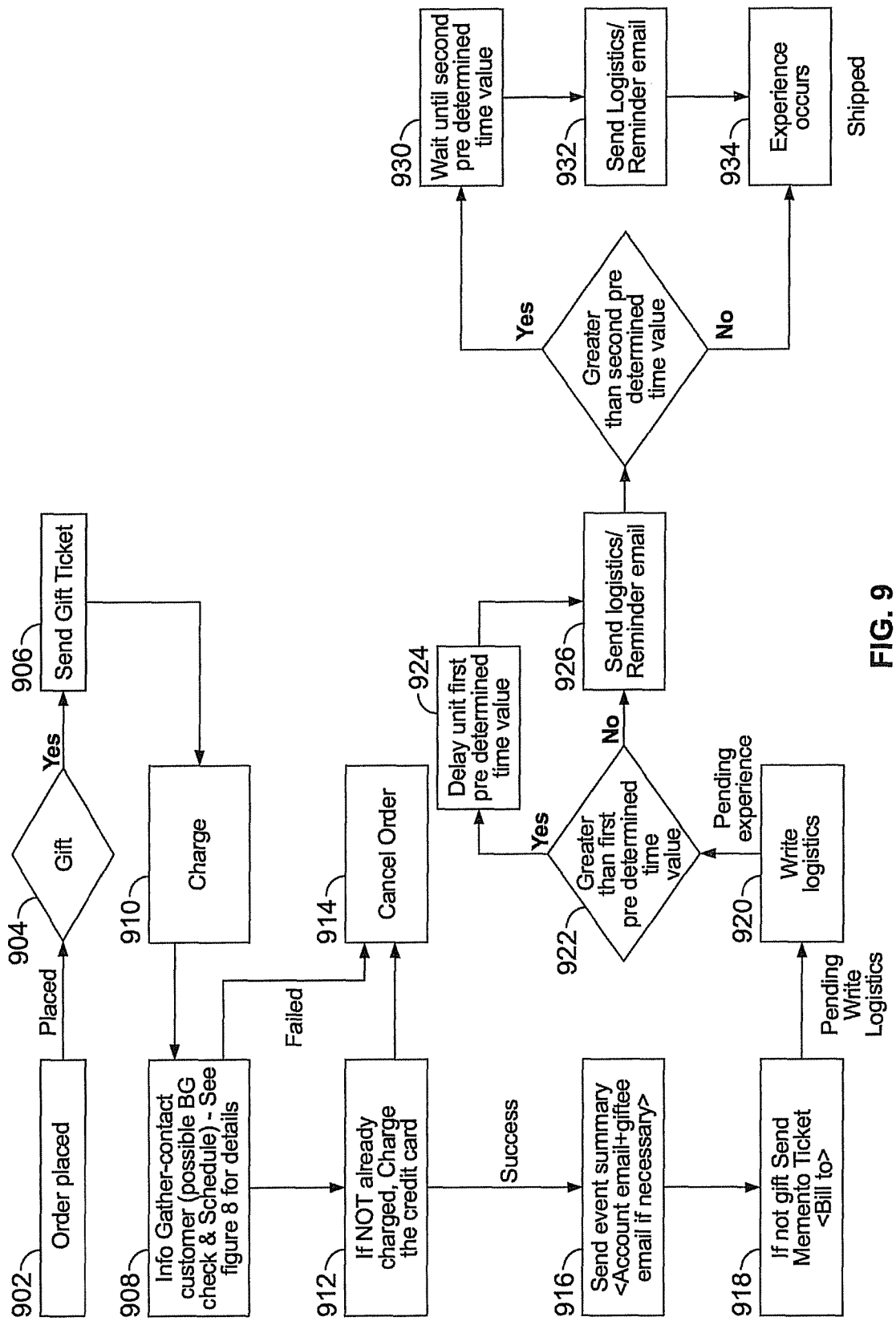
FIG. 9 is a flow chart depicting an example of order placement consistent with one or more aspects related to the innovations herein.

FIGS. 3 and 9 are exemplary flow diagrams of illustrative order placement and customer information processing functionality, respectively, consistent with one or more aspects related to the innovations herein. These diagrams provide an illustrative overview of how products with an experience product type may get processed by the back-end, after purchase. While back-end systems and methods may behave similarly to conventional ecommerce back-ends when processing conventional products, implementations herein may possess various novel functionality involved with efficiently handle experience product types. With regard to making an experience happen, multiple people must be brought together in the same place at the same time. Multiple people are involved and difficult to schedule a time and place that works for all involved. Determining, coordinating and communicating all the details of the logistics required for an experience is too time-consuming and error-prone without solutions such as those provided via the systems and methods herein. Among other things, implementations herein enable fulfillment of many experience orders simultaneously, with various innovative processing, and without losing track of any details. Such implementations provide features and functionality that are essential to providing a good experience for the buyers and sellers involved, while accomplishing objectives at a low cost to provide better value to customers while still maintaining suitable/sensible profit margins.

FIG. 9 is a flow chart depicting an example of order placement consistent with one or more aspects related to the innovations herein. FIG. 9 provides one illustrative high level overview of a back-end fulfillment process for experiences. This process may be performed by the processor circuit 201 and/or experience module 220 of the system 200. The illustrative backend processing of an order shown here begins when the order is successfully placed on the front end by a customer, at 902. In some cases, a purchase is made as gift 904, in which case the purchaser is not buying the experience for themselves, but instead is giving it as a gift to another person. The recipient will receive a Gift Ticket in this case, at 906. If the gift case, the customer may be charged immediately after the Gift Ticket is sent, at 910, which is earlier in the fulfillment process than charging sometimes occurs in the non-gift case.

As a next step in this illustrative fulfillment process, at 908, one or more information gathering processes may be performed, e.g., to make sure all the necessary information has been gathered from the customer or the gift recipient, such as information to schedule the experience and/or do a background check if necessary. Exemplary details of what may occur during an illustrative information gathering process 908 are set forth in connection with FIG. 3. If this processing fails, the order may be canceled, at 914. After a successfully completed background check and/or scheduling processes, at 912, payment may be effected, e.g., the customer's credit card may be charged (settled) to collect the revenue for experiences. Here, the credit card may have been previously been authorized for the amount of the purchase, so unless the authorization had expired, the credit card charge/settle will succeed. If the original authorization has expired, and the credit card was not able to be authorized again, then the order may be cancelled 914 at this point due to the inability to collect payment. If the money was successfully collected, an event summary email may then be sent, at 916, summarizing what will happen and when. If the experience is not a gift, an experience memento ticket may be sent to the buyer, at 918.

After such optional processing is performed, final logistics such as final location logistics may be determined and entered into the system, at 920. In some cases, for example, the experience may happen at a location selected by the customer or giftee. In other cases, it will happen at the location chosen by the luminary/vendor. In either case, the final logistics information will be entered into the system, so they can be communicated to the customer and/or the celebrity/vendor, as in steps 922-934, via various email or other communication(s) such as the following.

For example, implementations herein may send out up to two additional reminder emails, the first of which will be sent at a first pre determined time value before the experience, at 926. For example, the first predetermined time value may be a day, a week, a month, or any other time. If there is greater than the first pre determined time value until the experience, the system may wait until there is an amount of time equal to the first pre determined time value before the experience to send the reminder/logistics email, at 924. Another reminder/logistics email may be sent closer in time, as well, such as at a second pre determined time value, less than the first predetermined time value, before the experience, 928, 930, 932, unless there is not more than an amount of time equal to the second pre determined time value before the experience. Finally, the experience that the customer purchased occurs, 934, and the presently described, illustrative experience fulfillment process is complete.

Celebrations Example

Figure 10:
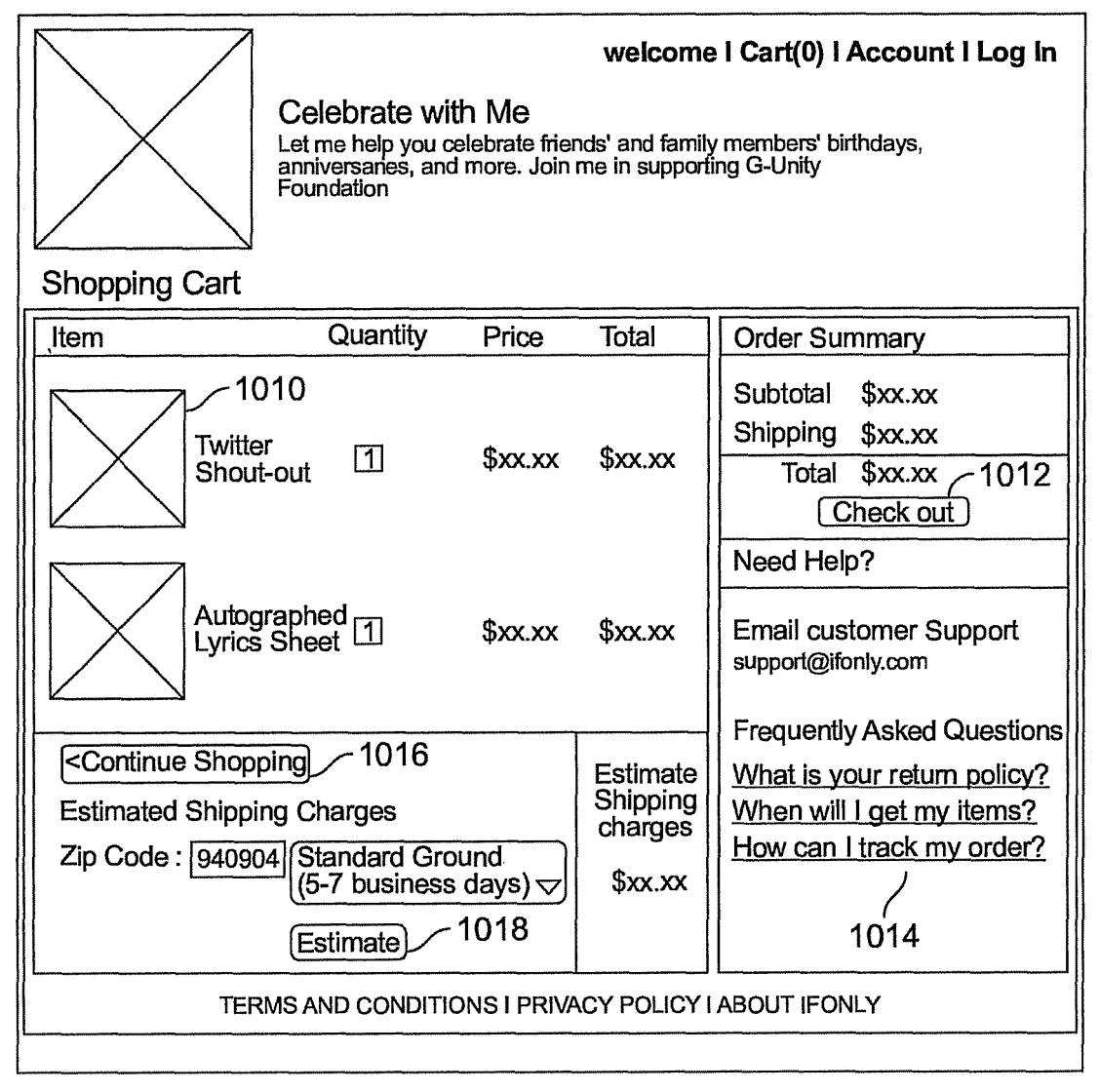

FIG. 10 is an illustration of exemplary shopping cart/ordering pages, consistent with one or more aspects related to the innovations herein. Items 1010 added to the Shopping Cart will display in the order they were added, and remain for X days. Some items allow users to update quantities from here, and some only allow a single purchase (e.g. Twitter or Facebook items.) The user can select the "x" next to a product and it will be dynamically removed from the order summary. If the user updates the quantity the page will auto-refresh and display the updates quantity, and the updated order total automatically. Users may select "Check Out" button 1012 in order to complete the order. A "Need Help" module 1014 will display FAQs and the support email address. This may be static content added by the editor. A "Continue Shopping" button 1016 may be included to take the user to the page previously viewed when the Shopping Cart was accessed. A shipping estimator 1018 will allow the user to enter her zip code, select the shipping speed and view the shipping costs she will expect to pay based on what is currently in her cart. The shipping charge may be dynamically displayed in the module and in the Order Summary module. A Check Out button may take the user into the Checkout Flow/Shipping page, as shown and described herein.

FIG. 11 is an illustration of exemplary checkout/shipping pages, consistent with one or more aspects related to the innovations herein. Referring to the illustrative shipping page of FIG. 11, a user may enter their zip code here and the related city(s) will appear in a drop-down menu for the user to confirm city name dynamically. "United States" (or other related country or US territory) will be displayed based on zip code entered as well. The Order Total 1112 will dynamically update to reflect in shipping charges. The shopping cart contents 1114 will be viewable in this space on every page of the Shopping Cart pages. The user can click "Edit Cart" button 1116 at any time to return to the cart to update product quantities or remove or add a product. Functions associated with checkout processing may be performed by the processor circuit 201 and/or checkout module 240 of the system 200.

Figure 12:
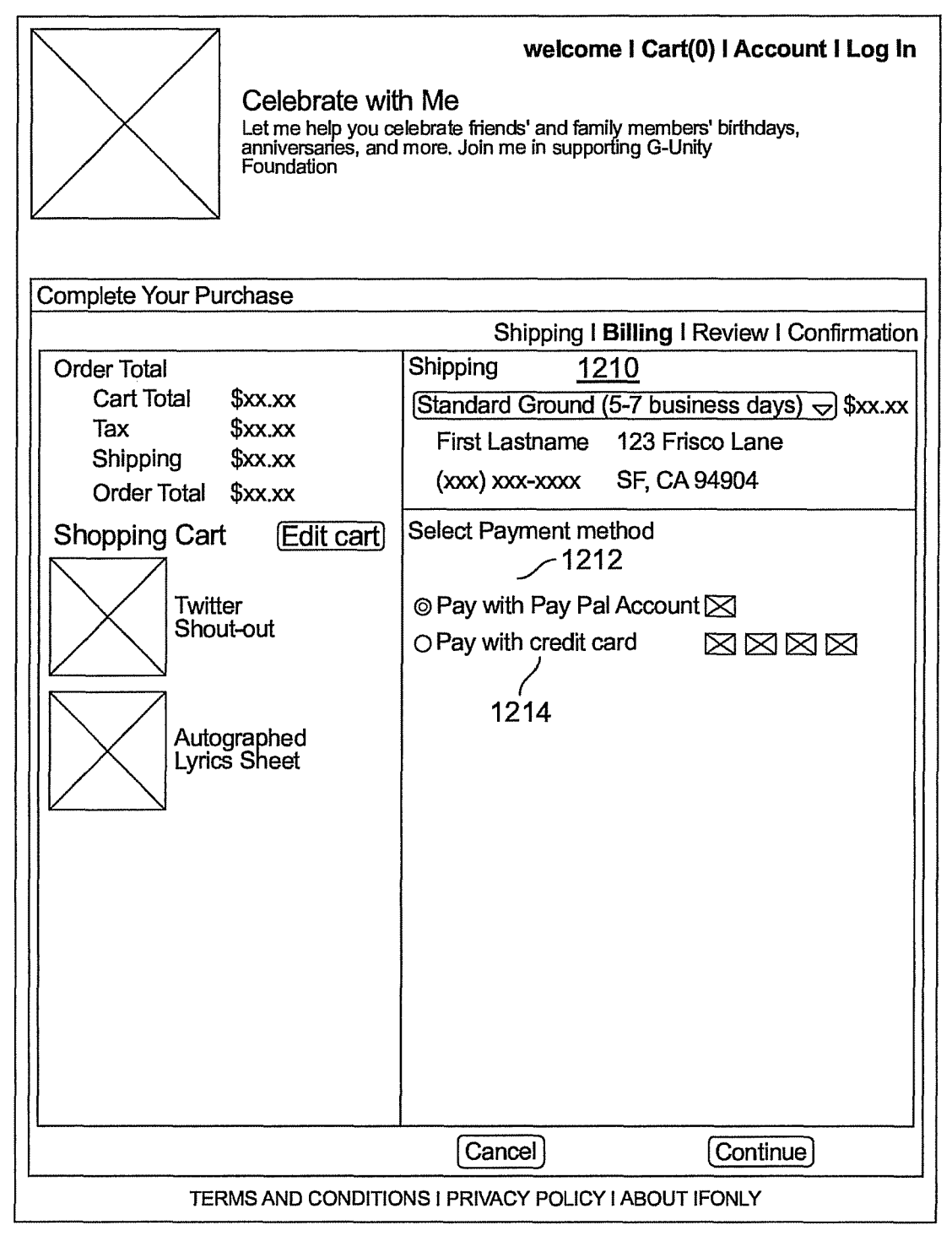

FIG. 12 is an illustration of exemplary billing/purchasing pages, consistent with one or more aspects related to the innovations herein. Referring to the illustrative billing page of FIG. 12, the user can click the "Edit" button 1210 and return to the "Shipping" page to change the shipping contact details. The user can update the shipping speed at any time by selecting it in the dropdown menu. This will dynamically update the Order Total module in the in the upper left corner. The user can select "Pay with PayPal Account" 1212 and be directed off the Celebrations site to the PayPal page associated with this account (note that any number of online payment systems could be used in place of PayPal). Once fulfillment has been made, the user will be automatically directed back to this page to complete the purchase path, and PayPal will be in a selected state. The user can select "Pay by Credit Card" 1214 and the page will dynamically expose all the relevant form fields for the user to complete a credit card transaction. As shown in FIG. 12, if the user selects "Pay by Credit Card" the page would automatically display relevant credit card authorization fields.

Figure 13:
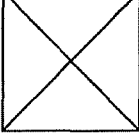
FIG. 13 is an illustration of further exemplary billing/purchasing pages, consistent with one or more aspects related to the innovations herein.

FIG. 13 is an illustration of further exemplary billing/purchasing pages, consistent with one or more aspects related to the present innovations. In the illustrative billing page of FIG. 13, for example, the user may enter information into all the required fields in order to purchase 1310. On click of the "Continue" button 1312, the credit card will be checked for fraud or incorrect entries, and return errors associated with them, as shown in the drawings. The selected payment method may be displayed in this module as shown. The user click on the "Edit" button in order to return to the Billing Page to change the method. The user can create an account at the end, if an account has not yet been made. For users that have already created an account, all fields will be prefilled, and password/confirm password fields showing "*****" to mask the password. The "Send Me Email Updates" checkbox will be pre-selected. The user can bypass creating an account and go directly to the Confirm Order page.

Figure 14:
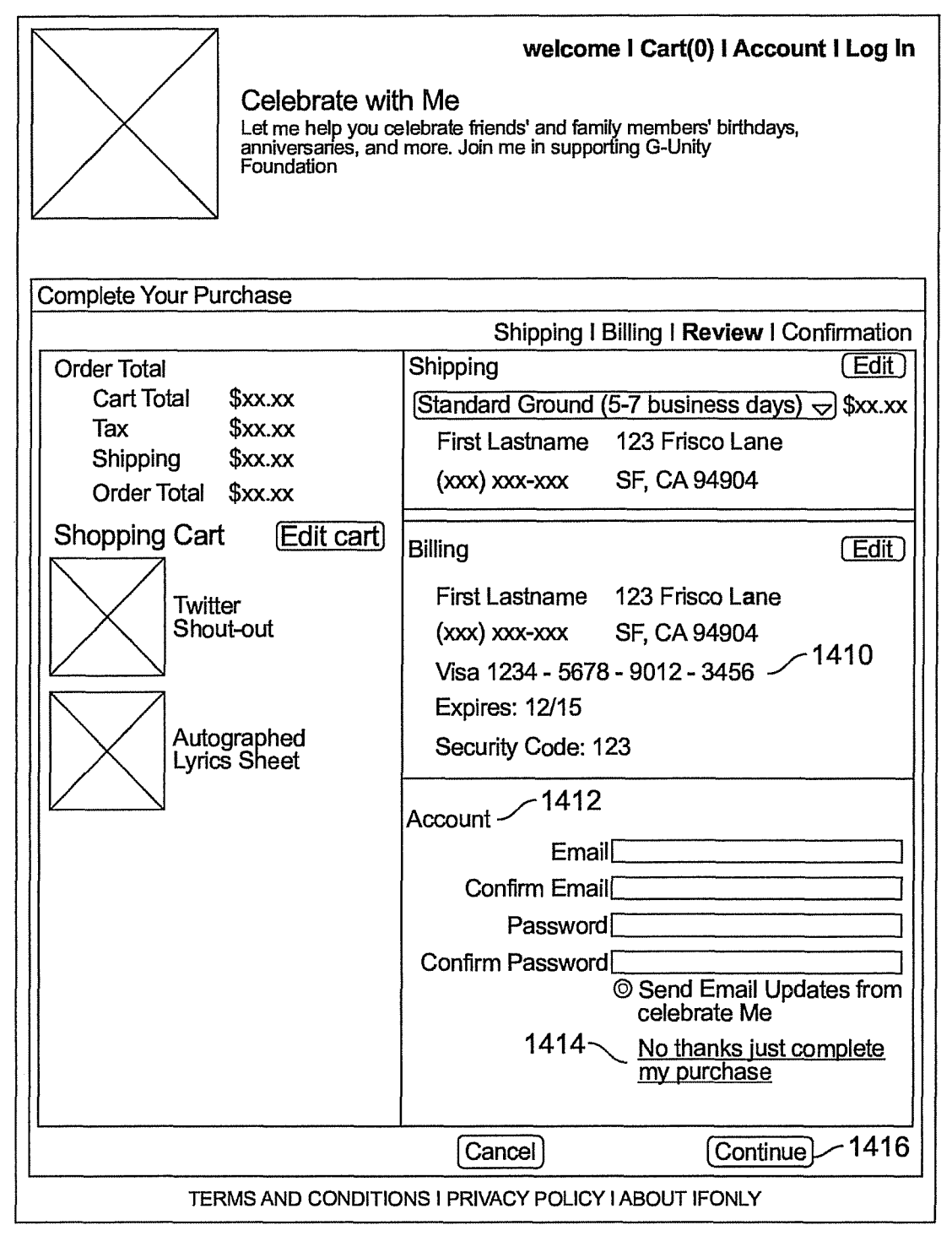

FIG. 14 is an illustration of exemplary purchase finalization pages, consistent with one or more aspects related to the innovations herein. Referring to FIG. 14, user billing information 1410 may be displayed from the previous input. The Account information area 1412 allows users to sign up for an account if they have not previously, or select "No Thanks" button 1414 to merely complete the transaction without signing up. The "Complete Purchase" button 1416 will submit the purchase and return a confirmation message to the user when the transaction has been made.

Figure 15:
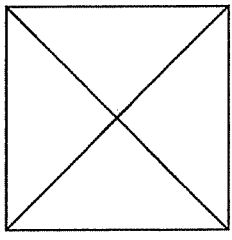
FIG. 15 is an illustration of exemplary confirmation pages, consistent with one or more aspects related to the innovations herein.

FIG. 15 is an illustration of exemplary confirmation pages, consistent with one or more aspects related to the innovations herein. Here, such confirmation page confirms the order, and may provide an order number 1510 and a link back to the Landing Page for this Celebrations site, as shown in FIG. 15.

Figure 16:
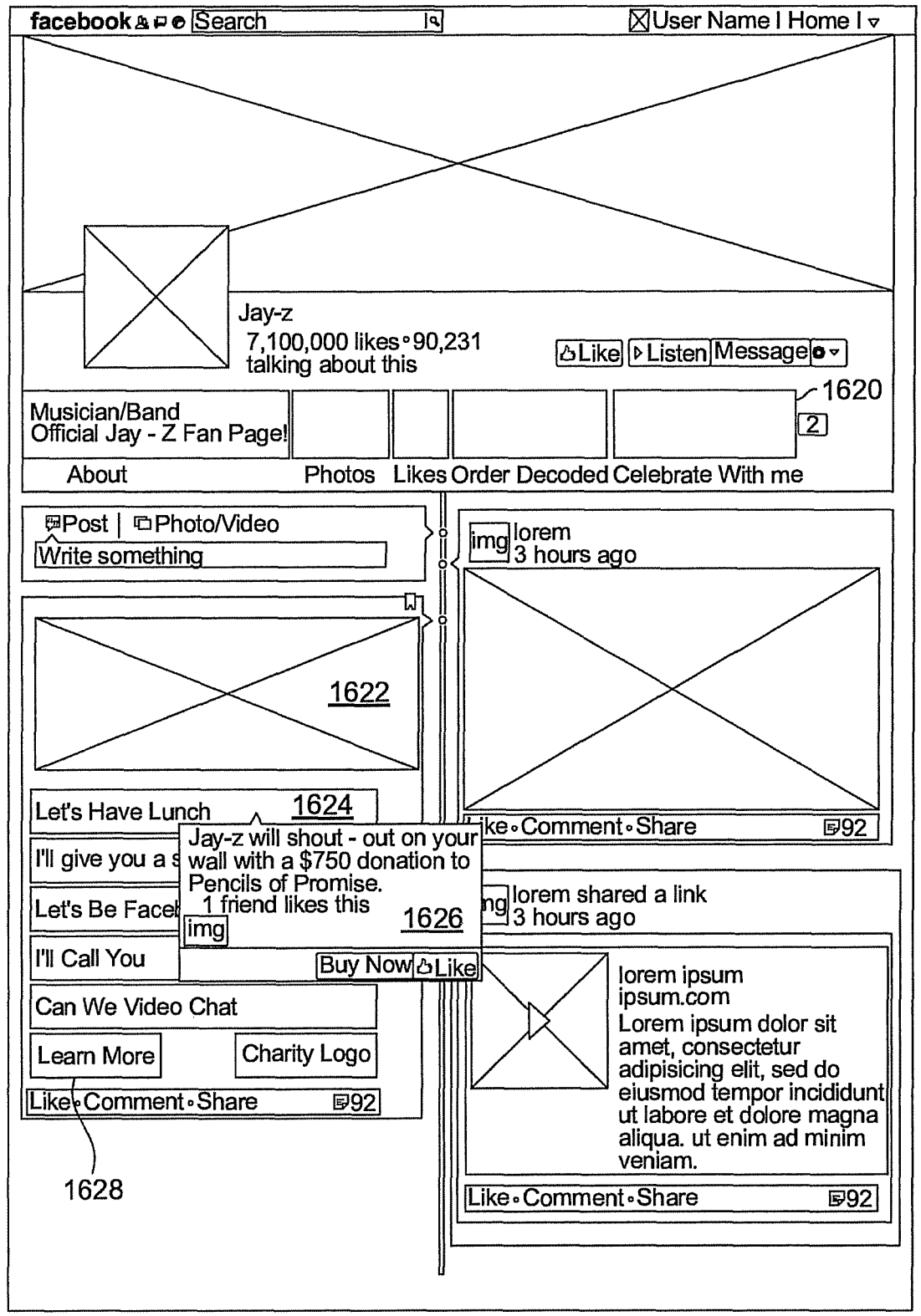
FIG. 16 is an illustration of an exemplary experience page, consistent with one or more aspects related to the innovations herein.

FIG. 16 is an illustration of exemplary pages consistent with aspects of the innovations herein. While the application could be integrated with any number of social media sites, this example illustrates an integration with the Facebook social media site. The social media processes described with respect to FIG. 16 may be performed by the processor circuit 201 and/or social media UI module 210 of the system 200. In this example, run via Facebook system processing, the page allows users to click the Celebrate With Me button 1620. The identification area 1622 may then describe the celebrity and advertise the Celebration. An example experience, here "let's have lunch" 1624 is highlighted. The user may inquire more about this experience by clicking on it or hovering over it. The pop-up window 1626 can show more details about the experience and allow the user to "Buy it Now." Further, the user may click the button to "Learn More" 1628 in order to learn more details. In FIG. 16, the user can click the "Buy Now" button 1626 and go directly to the permissions step, then to the Celebrations Product Page associated with that button.

Figure 17:
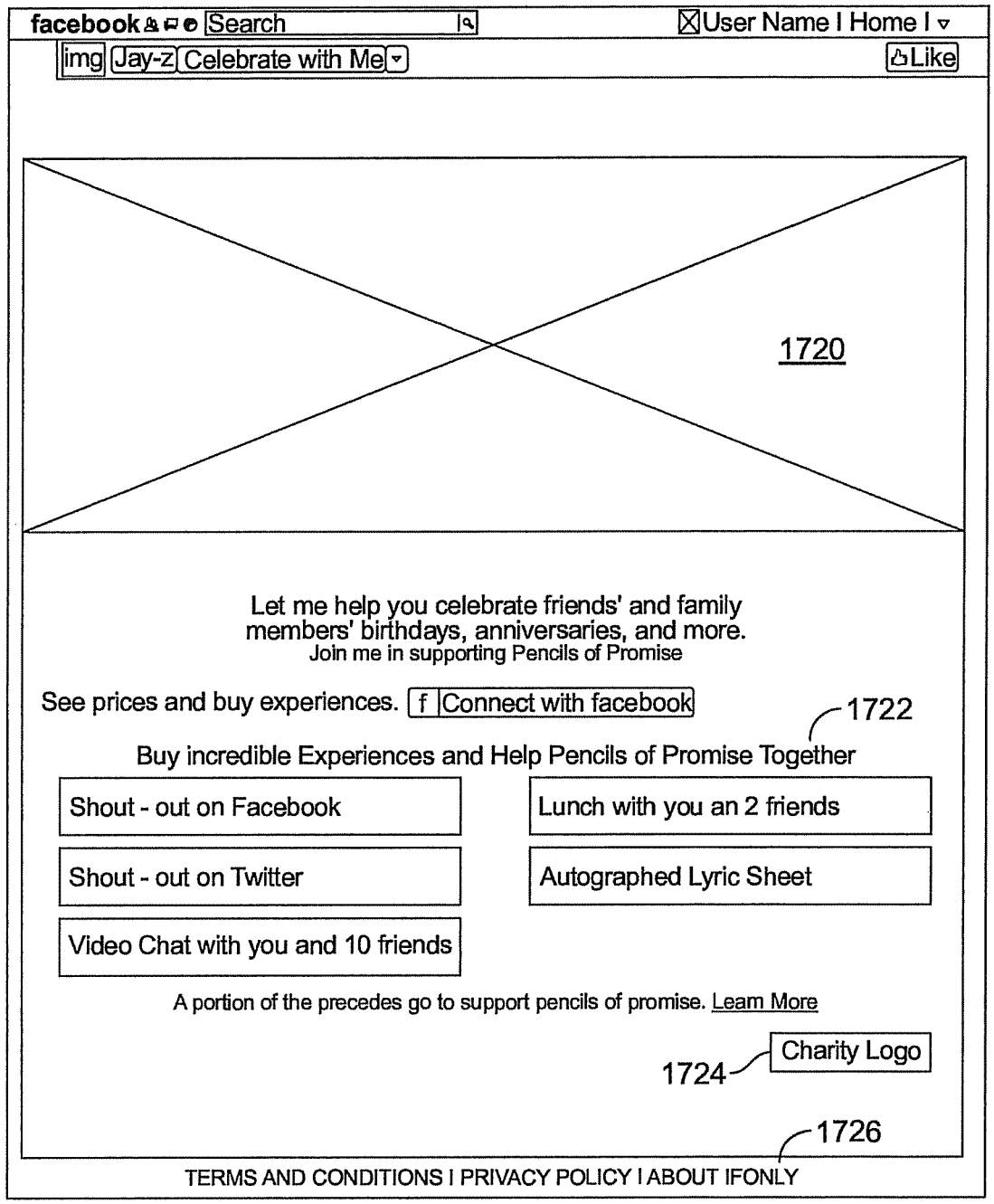
FIG. 17 is an illustration of an exemplary landing page, consistent with one or more aspects related to the innovations herein.

FIG. 17 is an illustration of an exemplary landing page, consistent with one or more aspects related to the innovations herein. In this example, the landing page is displayed to a user who is not logged in to the system, but information similar to that presented in this example may also be presented to a user in other contexts. While the application could be integrated with any number of social media sites, this example illustrates an integration with the Facebook social media site. In this example, e.g. run via Facebook system processing, the Celebrations App Canvas page 1720 will provide the user with an overview of the Celebrity's Celebrations offerings. This canvas space may give the social networking site user a destination to visit while within the social networking site, and a starting point into the external experience via the "Connect with Facebook" button and "Connect to see the price" links. The user may click the "Connect with Facebook" or the "Connect to see the price" links in order to access the Celebrations external site. This will launch the Facebook Permissions window in the Facebook example, then take the user into the Celebrations site once Facebook Permissions have been granted. High level overview of all the current offerings available on the Celebrations web site for this celebrity may be provided in this space 1722. The design may allow for text updates as the celebrity's offerings change. The user may have secondary calls-to-action in this interface (e.g., "Connect to see the price") that may also launch the Facebook Permissions window, then take the user into the Celebrations site once Facebook Permissions have been granted. A charity tied to the celebrity's Celebrations program may be featured in this space 1724 if the celebrity's product is associated with a charity. The charity's logo and the "learn more" link may both open in a separate browser window when clicked, and may display the charity's "About Us" page on their web site. The footer links 1726 may take the user to the related page on an external Celebrations non-authenticated site if the user clicks on Terms and Conditions, Privacy Policy or About Us links. In other embodiments, some or all of the external features may be included within the social networking app, so that a user's interaction with the links/buttons may cause new data to be displayed within the social networking site itself.

Figure 18:
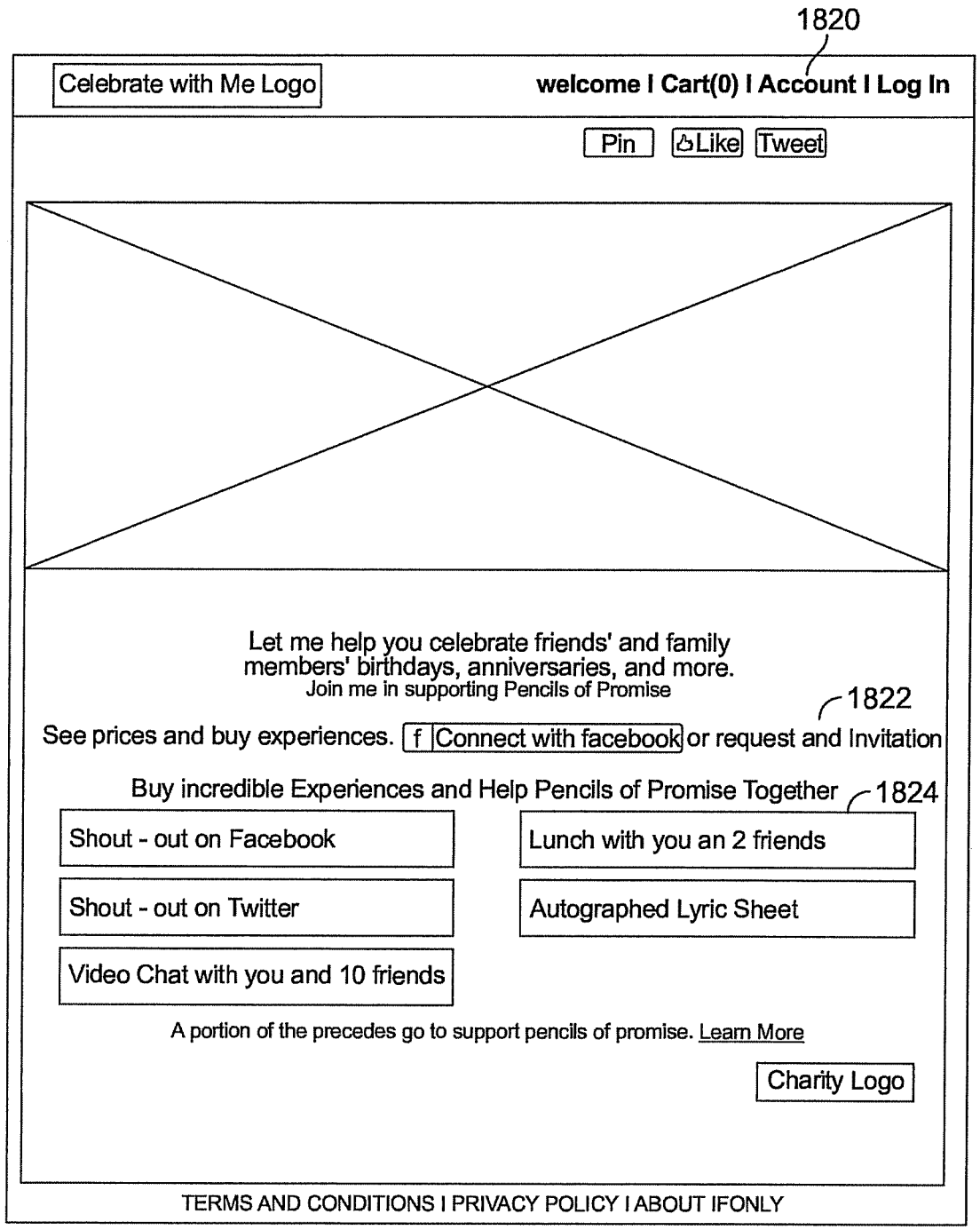
FIG. 18 is an illustration of an exemplary landing page, to enable users to harness the power of social media with the experience fulfillment system, consistent with one or more aspects related to the innovations herein.

FIG. 18 is an illustration of an exemplary landing page, to enable users to harness the power of social media with the experience fulfillment system, consistent with one or more aspects related to the innovations herein. In this example, the landing page is displayed to a user who is not logged in to the system, but information similar to that presented in this example may also be presented to a user in other contexts. While the application could be integrated with any number of social media sites, this example illustrates an integration with the Facebook social media site. In this example, the Global Navigation bar 1820 may display a welcome message if a user accesses the site and is not recognized. The user may not be able to see prices of any items or buy anything until she clicks the "Connect with Facebook" button. Log in may prompt the user to use Facebook Connect to log in again from here or enter an email address and password used when requesting an invite. The user can also click on the "Connect with Facebook" button to log in. The system may then bypass the Accept Permissions window and refresh the site with the signed-in state if a user has previously granted Facebook Permissions for this site. Users can also access prices and buy items by clicking the "request an invitation" link 1822. The "Connect with Facebook" button may present the Accept Permissions window, and the "request an invitation" link may present the "Request an Invitation" pop-over window. Each item for sale may display information which may enable a user to learn more about the item, for example its title, short description, and "Connect to see Price" link 1824 in place of the price. The user may be required to click "Connect with Facebook" or create a password from an email invite in order to see the price. The button image and the item title may both link to the corresponding Product Detail Page, which may be an external page in some embodiments or an internal part of the social media app in other embodiments.

Figure 19:
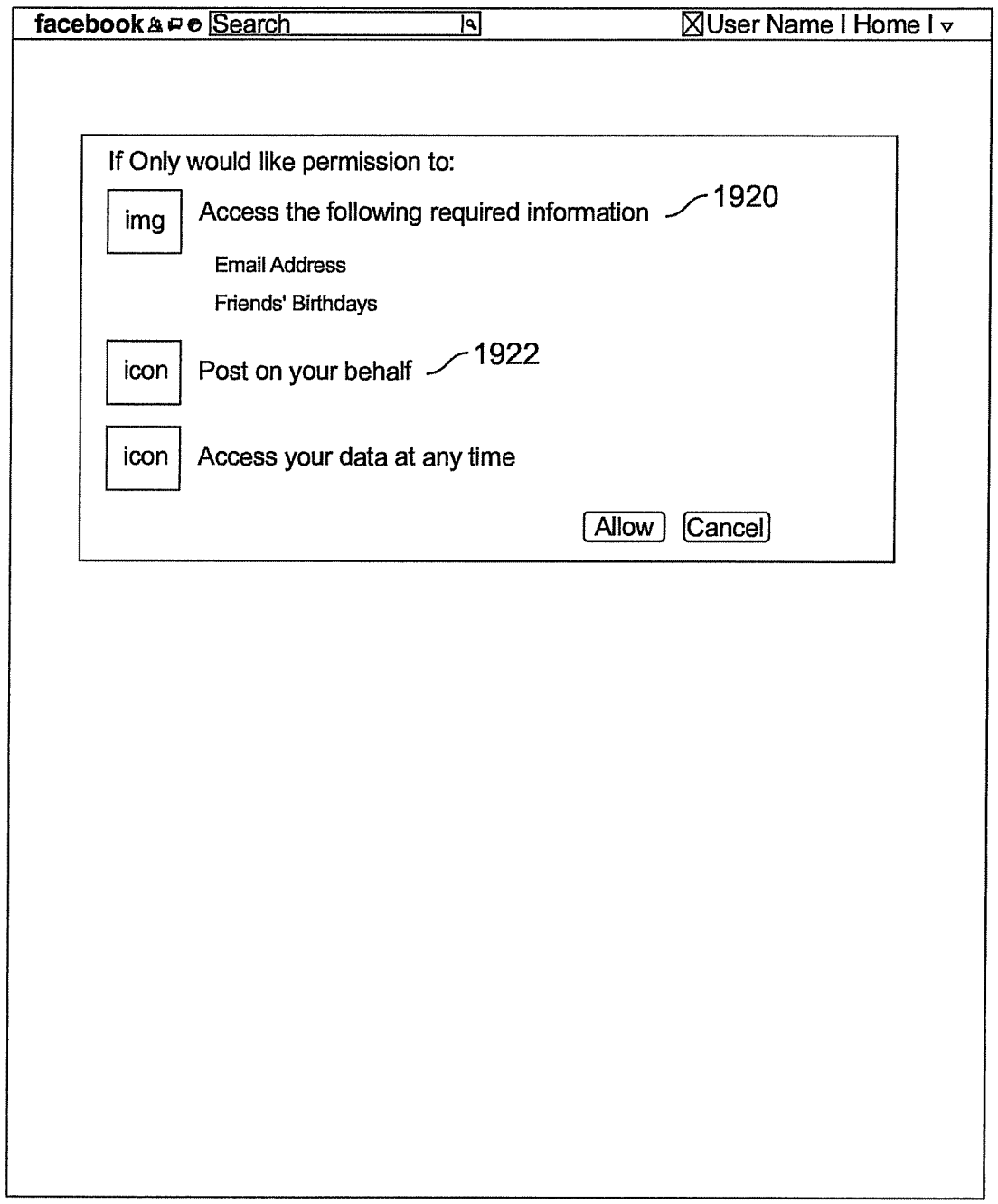
FIG. 19 is an illustration of an exemplary social media site permissions page, consistent with one or more aspects related to the innovations herein.

FIG. 19 is an illustration of an exemplary social media site permissions page, consistent with one or more aspects related to the innovations herein. While the application could be integrated with any number of social media sites, this example illustrates an integration with the Facebook social media site. In this example, all users that click on the "Connect with Facebook" or "Buy Now" button or the "Connect to see Price" link may be required to accept Facebook Permissions, shown in this space 1920, to visit the Celebrations site and purchase items, via the "Allow" button. On click, the system may store the user's Facebook ID and all public data. Post on your behalf 1922 can be turned off by users, but if it is not then the app can post to a user's Facebook timeline. Notifications and posts to an authenticated user's Facebook timeline could include, for example, the following triggers: NEW ITEM—"[celebrity name] just added something new to his/her Celebrations site. Visit [celebrity name] Celebrations."; FRIEND PURCHASE—" [Friend name] just purchased something from the [celebrity name] Celebrations site. Visit [celebrity name] Celebrations."; PROMOTIONAL ITEM—"[product name] is now available on the celebrity name] Celebrations site. How much would you spend to own it?"; LIMITED QUANTITIES—"Only [x] more available of [product name] [celebrity name.] Buy it now on [celebrity name] Celebrations."

Figure 20:
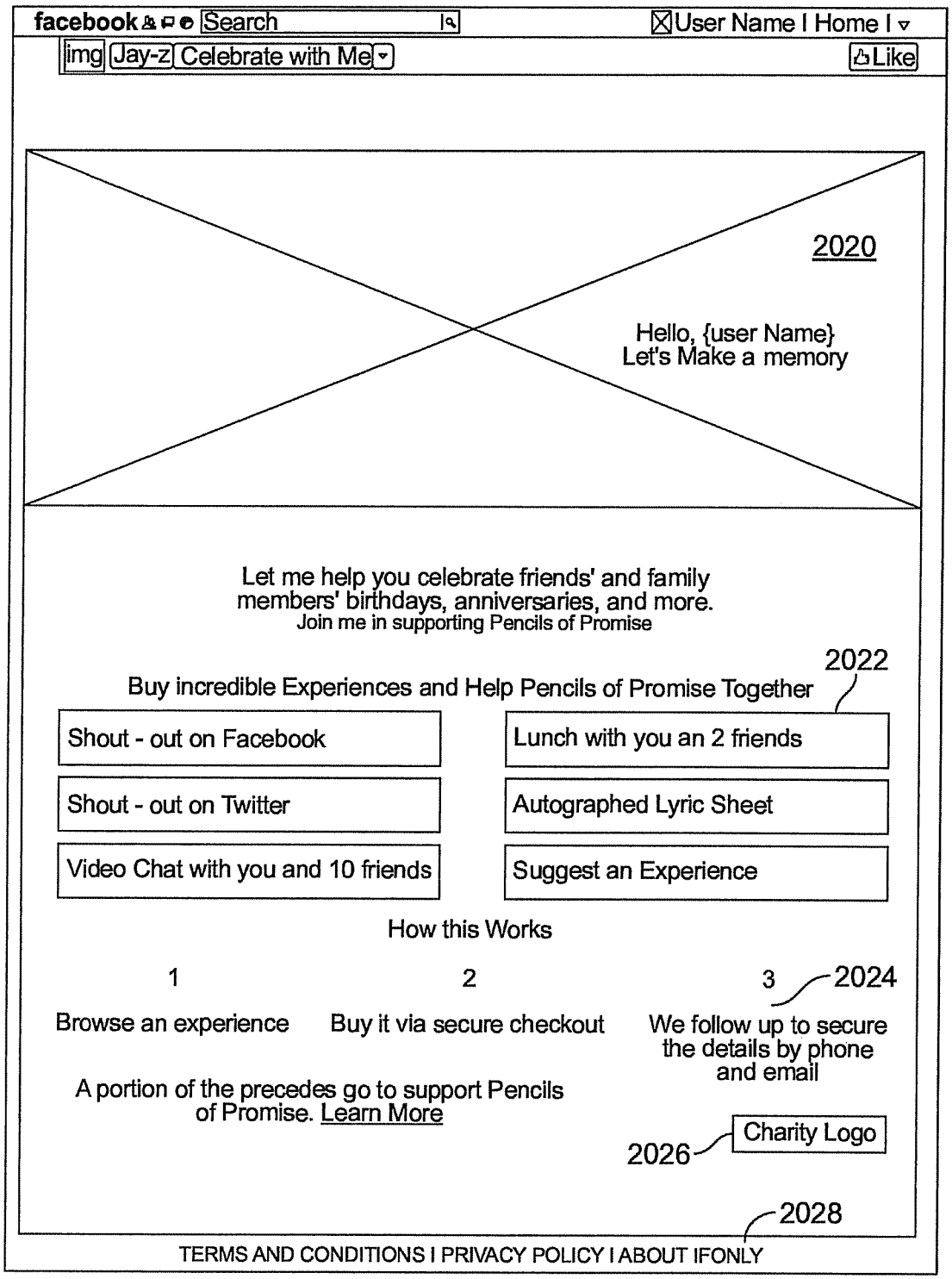
FIG. 20 is an illustration of an exemplary landing page displayed when the user is logged in, consistent with one or more aspects related to the innovations herein.

FIG. 20 is an illustration of an exemplary landing page, consistent with one or more aspects related to the innovations herein. In this example, the landing page is displayed to a user who is not logged in to the system, but information similar to that presented in this example may also be presented to a user in other contexts. While the application could be integrated with any number of social media sites, this example illustrates an integration with the Facebook social media site. In this example, once the user's permissions have been granted, he or she will be recognized with their first name 2020 pulled from their Facebook profile. Each item for sale may display its button background shape, title, short description, and price 2022. The button image, item title and "learn more" link may all link to the Product Detail Page, which may be an external page in some embodiments or an internal part of the social media app in other embodiments. A How this Works section 2024 may describe to the user the steps of the transaction. The Charity's logo 2026 and "learn more" link may all take the user to the related page on the Charity's own web site, popped up in a separate browser window. The footer links 2028 may be accessible to signed-in and unrecognized users; clicking any of them will take the user to the respective page in the same browser window. In other embodiments, some or all of the external features may be included within the social networking app, so that a user's interaction with the links/buttons may cause new data to be displayed within the social networking site itself.

Overall, one illustrative implementation encompassing an array of the above features may be characterized as a system for processing data comprising a processor circuit; a fulfillment module in communication with the processor circuit, the fulfillment module configured to process information to perform a checkout of a product, the product comprising an experience, a physical product, and/or a digital product; when the product comprises the experience, receive a notification that the experience has taken place and indicate that the product has been fulfilled; when the product comprises the physical product and/or the digital product, determine whether the product will be fulfilled by a vendor or by the fulfillment module and receive a notification that the product has been fulfilled; when the product will be fulfilled by the vendor, send information associated with the product to the vendor; and when the product will be fulfilled by the fulfillment module, fulfill the product; an experience module in communication with the processor circuit, the experience module configured to schedule a time and/or place at which the experience will take place; and a checkout module in communication with the processor circuit, the checkout module configured to process a charge associated with the product after the product has been fulfilled.

Further Implementations and Nuances

Systems and methods herein implemented via stand-alone webpage configuration(s) may not be appropriate for all celebrities. In these cases, implementations may be configured to produce a white-label version of the platform. For example, celebrity may have a large fan base, but may also need assistance in order to maintain and not damage their brand. Conversely, systems and methods may also be configurable to create custom platforms and functionality for other celebrities such as a George Clooney or Angelina Jolie.

The innovations herein may be implemented via one or more components, circuits, systems, servers, appliances, other subcomponents, or distributed between such elements. When implemented as a system, such systems may include an/or involve, inter alia, components such as software modules, general-purpose CPU, RAM, etc. found in general-purpose computers, and/or FPGAs and/or ASICs found in more specialized computing devices. In implementations where the innovations reside on a server, such a server may include or involve components such as CPU, RAM, etc., such as those found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

APPENDIX A

```
ProductTypes
SELECT 'ProductTypes' AS ACTION;
DROP TABLE IF EXISTS ProductTypes;
CREATE TABLE IF NOT EXISTS ProductTypes (
    productTypeId            SMALLINT NOT NULL auto_increment,
    productTypeName          varchar(75),
    uiGroup                  varchar(20),
    physical                 boolean not null default 0, --
physical real world item or in person event (if false is digital item
or event than can be transfered electronically)
    experience               boolean not null default 0, --
experience that happens in real time (physical or digital)
    personalized             boolean not null default 0, -- this
item can be personalized, so need to ask user for personalization info
when buying
    usePresetEventTime       boolean not null default 0, -- if
true, use products.eventTime
    produceByScheduleTime    boolean not null default 0, -- if
true, use orderItemInfos.scheduleTime as the time the item needs to be
produced by
        -- as long as the item is produced before this time,
all is well
    negotiateScheduleTime    boolean not null default 0, --
if true, use orderItemInfos.scheduleTime
to store the result of the scheduling process
    allowVendorEntry         boolean not null default 0, --
celebrity/vendors can enter products of this type
    negotiableLocation       boolean not null default 0, -- if
false means fixed location
    bestContactInfoNeeded    boolean not null default 0, -
- if true, means ask for Best Phone number, best email to reach you
AFTER CHECKOUT
    occasionBeforeCheckoutNeeded  boolean not null default 0, -
- if true, ask for occassion before checkout
    occasionAfterCheckoutNeeded   boolean not null default 0, -
- if true, ask for occasion after checkout
    facebookIdNeeded         boolean not null default 0, -- if
true, will ask for facebook ID of the user or obtionally from the
users list of friends
    twitterHandleNeeded      boolean not null default 0, --
if true, will ask for the Twitter handle from the user
    nameNeeded               boolean not null default 0, -
- ask for the users name
    commentBeforeCheckoutNeeded   boolean not null default 0, --
Must add comments before checkout
    commentAfterCheckoutNeeded    boolean not null default 0, --
Must add comments after checkout
    eventTypeAfterCheckoutNeeded  boolean not null default 0, --
ask for event type after checkout
    infoBeforeCheckoutNeeded boolean not null default 0, --
ask from info before checkout
    nameAfterCheckoutNeeded  boolean not null default 0, -
- ask for the users name after checkout
```

APPENDIX A-continued

```
    recipientEmailNeeded     boolean not null default 0, -- ask
for recipient Email before checkout
    primary key(productTypeId),
    index(uiGroup)
) ENGINE = InnoDB;
```

APPENDIX B

```
Flags in productTypes table
replace into producttypes values (1, 'Product Physical', "G2",
                              1,0,0,0,0, 0,1,0,0,0,0,
0,0,0,0,0, 0,0);
replace into producttypes values (2, 'Facebook Post', "G1",
                              0,0,1,0,1, 0,1,0,0,0,0,
0,0,0,0,0, 0,0);
replace into producttypes values (3, 'Twitter Follow', "G1",
                              0,0,1,0,1, 0,1,0,0,0,0,
0,0,0,0,0, 0,0);
replace into producttypes values (4, 'Twitter Shout Out', "G1",
                              0,0,1,0,1, 0,1,0,0,0,0,
0,0,0,0,0, 0,0);
replace into producttypes values (5, 'Chat Video', "G1",
                              0,1,1,0,0, 1,1,0,0,0,0,
0,0,0,0,0, 0,0);
replace into producttypes values (6, 'Chat Phone Call', "G1",
                              0,1,1,0,0, 1,1,0,0,0,0,
0,0,0,0,0, 0,0);
replace into producttypes values (7, 'Event Physical', "G1",
                              1,1,0,1,0, 0,0,0,1,0,0,
0,0,0,0,0, 0,0);       -- this is a celebrity happening
that has a predefined date, time, and location
replace into producttypes values (8, 'Subscription', "G1",
                              0,0,1,1,0, 0,0,0,0,0,0,
0,0,0,0,0, 0,0);
replace into producttypes values (9, 'Badge', "G1",
                              0,0,1,0,1, 0,0,0,0,0,0,
0,0,0,0,0, 0,0);
replace into producttypes values (10, 'Event Pre-announce List',
"G1",                         0,0,0,1,0, 0,0,0,0,0,0,
0,0,0,0,0, 0,0);
replace into producttypes values (11, 'Message Video', "G1",
                              0,0,1,0,1, 0,1,0,0,0,0,
0,0,0,0,0, 0,0);
replace into producttypes values (12, 'Meeting Scheduleable Digital',
"G1",                         0,1,1,0,0, 1,0,0,1,1,0,
0,0,0,0,0, 0,0);       -- this is a digital happening
where the date, time and location is negotiable and can be changed
replace into producttypes values (13, 'Meeting Scheduleable
Physical', "G1",              1,1,1,0,0,
1,0,0,1,1,0, 0,0,0,0,0, 0,0);  -- this is a digital
happening where the date, time is negotiable and can be changed, the
location is fixed
replace into producttypes values (14, 'Event Digital', "G1",
                              0,1,0,1,0, 0,0,0,1,0,0,
0,0,0,0,0, 0,0);       -- this is a celebrity
happening that has a predefined date, time, and location
replace into producttypes values (15, 'Gift Certificate Digital',
"G1",                         0,0,0,0,0, 0,0,0,0,0,0,
0,0,0,0,0, 0,0);
replace into producttypes values (16, 'Gift Certificate Physical',
"G1",                         1,0,0,0,0, 0,0,0,0,0,0,
0,0,0,0,0, 0,0);
replace into producttypes values (17, 'Meeting Scheduleable Physical
Location negotiable',"G1",    1,1,1,0,0, 1,0,1,1,1,0, 0,0,0,0,0,
0,0);                         -- 1 this is a digital happening where the
date, time, and LOCATION is negotiable and can be changed
replace into producttypes values (18, 'Product Physical Personalized',
"G2",                         1,0,1,0,0, 0,1,0,0,0,0, 0,0,0,0,0,
0,0);
```

The invention claimed is:

1. A method of computerized information processing of data objects performed at a computer system, the computer system including one or more processors and memory storing instructions to be executed by the one or more processor, the method comprising:

storing in a database product data of products for purchase, the products for purchase including experiences with luminaries, physical products and/or digital products the product data including: one or more of a plurality of product types, one or more of a plurality of product type flags that describe one or more of the plurality of product types, and one or more of a plurality of product type flag field definitions that define one or more of a plurality of characteristics of one or more of the plurality of product type flags;

performing fully-automated computerized processing regarding fully-computerized fulfillment of the products, including:

generating, for display to the user, at least one checkout display interface that is automatically customized including generating one or more first fields that are displayed for completion by a user, wherein the one or more first fields are automatically populated based on Boolean variables associated with a product selected by the user and receiving user selection of one or more of the plurality of product types, and/or one or more of the plurality of product type flags, and/or one or more of the plurality of product type flag field definitions, wherein the user selection identifies a first product for purchase;

responsive to a determination that that the first product for purchase is a personal experience with a luminary, performing a fully-computerized checkout processing of the personal experience as a purchased product, including:

obtaining payment from the user for purchase of the personal experience with the luminary;

generating for display on a computing device associated with the luminary at least one fulfillment display interface that is automatically customized by including one or more second fields, which are displayed for completion by the luminary, wherein the one or more second fields are automatically populated based on the Boolean variables associated with the personal experience purchased by the user;

generating for display to the luminary a user interface that comprises two or more of:

a calendar that displays date and time that the personal experience is scheduled to occur, based on presence of a preset time flag associated with the first product;

first indicia based on a negotiable time flag and/or a negotiable location flag associated with the first product wherein the first indicia are displayed for interaction by the luminary to schedule the personal experience; and second indicia that display events to be fulfilled by the luminary, the second indicia including one or more data fields that are automatically populated for completion by the luminary based on the presence of Boolean flags associated with the first product selected by the user;

receiving input from the luminary indicating date and time availability for the personal experience with the user; and providing automated computerized notification to the user related to the purchased first product based on Boolean variables associated with the first product selected by the user.

2. The method of claim 1, further comprising:
scheduling a time and/or place for the personal experience, the scheduling comprising: determining whether the personal experience is prescheduled based on a product type flag field definition indicating that the first product for purchase has a preset time;

when the personal experience is prescheduled, setting the time and/or place as a prescheduled time and/or place; and when the personal experience is not prescheduled, processing based on a product type flag field definition indicating that the first product for purchase has a negotiable time and/or a negotiable location, a negotiated time and/or place received from the user and setting the time and/or place as the negotiated time and/or place.

3. The method of claim 1, wherein the plurality of characteristics comprises:

whether the product is an experience, based on a product type flag field definition indicating that the product is an experience; and whether the product is prescheduled, based on a product type flag field definition indicating that the product has a preset time; and whether information is required from the user for performing the checkout processing of the purchased product.

4. The method of claim 1, wherein the product data further comprises one or more product flags which define one or more of a plurality of custom properties of the products for purchase.

5. The method of claim 4, wherein the plurality of custom properties comprise:

a personalization information requirement that asks the user for personalization information and provides associated personalized interaction between the user and the luminary providing the personal experience as the purchased product;

a user background check requirement; and/or a user age verification requirement.

6. The method of claim 1, wherein the product data further comprises one or more order flags which define a custom property for the checkout processing.

7. The method of claim 6, wherein the custom property is defined based on input received by a front end module from the user.

8. The method of claim 1, wherein the personal experience includes a live interaction between the luminary and the user.

9. The method of claim 8, further comprising managing authentication of the user.

10. The method of claim 8, further comprising managing fulfillment of the first product, including:

selecting the first product from among a plurality of available products;

receiving approval of the selected product from the luminary offering the personal experience; and processing the selected product.

11. The method of claim 8, wherein the interaction is personalized to the user.

12. The method of claim 8, further comprising managing privacy of the luminary in executing the interaction.

13. The method of claim 8, further comprising providing a notification related to execution of the interaction.

14. The method of claim 8, wherein the interaction is automatically processed as a gift based on the database having a gift order flag associated with the purchased product.

15. The method of claim 1, wherein the receiving the user selection is via a mobile application.

16. The method of claim 1, further comprising automatically presenting, to the user, a graphical user interface (GUI) including an option to select the personal experience as the purchased product and offer a bid for a price that the user is willing to pay for the experience.

17. The method of claim 1, wherein the generating for display on the computing device associated with the luminary comprises
executing an administrator graphical user interface (GUI) routine that provides an administrator GUI to the luminary, wherein the administrator GUI provides functionality or actions to the luminary based on the product type identifiers and/or the Boolean flags, the functionality or actions comprising two or more of: scheduling functionality, a calendar that includes a display of purchased products that have been scheduled, providing a list of action items that still require action or completion, providing fulfillment functionality, providing marketing functionality, and/or providing information regarding physical items that require fulfillment or personalization.

18. The method of claim 1, further comprising generating a vendor administration GUI that includes scheduling functionality to schedule the luminary's experiences associated with the purchased product with customers, wherein the generating the vendor administration GUI includes automatically generating, for display on a graphics display, visualizations of interactive scheduling functionality to schedule the luminary's experiences with customers as a function of the product type identifiers and Boolean flags.

19. The method of claim 1, further comprising one or more product management routines that allows the user and the luminary to manage processing of the personal experience purchased by the user by automatically providing different GUI screens as a function of product classification information within the database, including one or more of item types, item type flags, and/or item type flag field definitions.

20. The method of claim 1, further comprising determining a time or place to schedule the personal experience including:
automatically determining whether the experience is prescheduled as a function of the product type identifier and/or the Boolean flag;
automatically executing a first routine when the experience is prescheduled, including setting the time or place as a prescheduled time or place; and
automatically executing a second routine when the experience is not prescheduled, including receiving a negotiated time or place from a user and setting, with the backend module, the time or place as the negotiated time or place.

21. The method of claim 1, further comprising executing one or more additional routines as a function of the product type identifiers and/or the Boolean variables, the routines including:
processing first user input associated with a selected user experience, wherein the user input is associated with one or more of the product type identifiers or the Boolean variables and is used to automatically generate GUI screens corresponding to the experience selected;
processing the first user input to automatically populate GUI elements associated with scheduling functionality related to the experience selected; and
processing second user input associated with the GUI elements to provide scheduling functionality that automatically performs a time scheduling subroutine.

22. The method of claim 1, further comprising:
managing privacy of the luminary throughout executing fulfillment of the purchased product and automatically processes background check information regarding the customers that purchase the experiences.

23. The method of claim 1, further comprising one or more product management routines that allows the user and the luminary to manage processing of the purchased experience by automatically providing different GUI screens as a function of product classification information within the database, including one or more of item types, item type flags, and/or item type flag field definitions.

24. The method of claim 1, further comprising:
storing item data in the database, the item data comprising one or more of a plurality of item types, one or more of a plurality of item type flags which describe one or more of the plurality of item types, and one or more of a plurality of item type flag field definitions which define one or more of a plurality of characteristics of one or more of the plurality of item type flags.

25. The method of claim 1, wherein the performing fully-automated computerized processing further comprises:
communicating, via Internet, between at least one processor of the computer processor and an experience module, the experience module containing a plurality of customized processing routines regarding experiences, which are physical events associated with the luminary and offered for sale to the user and which are included within the plurality of products identified by the Boolean variable and the database entries associated with each of the plurality of products, that are offered to the user for purchase, the customized processing routines including generating displays of information, performing checkout processing, and performing fulfillment processing that are customized based on the item types and the item type flags.

26. The method of claim 1, further comprising:
performing computerized processing to suggest products from a recommendation engine as well as automatically complete purchase and checkout of a suggested product via a mobile application associated with a vendor.

27. The method of claim 1, wherein the product data further comprises one or more product flags which define one or more of a plurality of custom properties of the product, wherein the plurality of custom properties comprises two or more of:
a personalization information requirement;
a user background check requirement; and/or
a user age verification requirement.

28. The method of claim 1, wherein the product data further comprises one or more order flags which define a custom property of the checkout processing, wherein the custom property is defined based on input received from the user.

29. The method of claim 1, wherein, as a function of computerized processing of the product type identifiers and/or the Boolean variables to automatically present and update graphical information being presented to the user and the luminary, a database and computer platform are generated that provide fully-computer-automated interactions regarding experiences between the user and the luminary without requiring any additional human involvement except fully-computerized interaction between the user and the luminary.

30. A computer system for processing data comprising:
one or more processors; and memory storing one or more programs for execution by the one or more processors, the one or more programs comprising instructions for:

storing in a database product data of products for purchase, the products for purchase including experiences with luminaries, physical products and/or digital products, the product data including: one or more of a plurality of product types, one or more of a plurality of product type flags that describe one or more of the plurality of product types, and one or more of a plurality of product type flag field definitions that define one or more of a plurality of characteristics of one or more of the plurality of product type flags;

performing fully-automated computerized processing regarding fully-computerized fulfillment of the products, including:

generating, for display to the user, at least one checkout display interface that is automatically customized, including generating one or more first fields that are displayed for completion by a user, wherein the one or more first fields are automatically populated as based on Boolean variables associated with a product selected by the user; and receiving user selection of one or more of the plurality of product types, and/or one or more of the plurality of product type flags, and/or one or more of the plurality of product type flag field definitions, wherein the user selection identifies a first product for purchase;

responsive to a determination that that the first product for purchase is a personal experience with a luminary, performing a fully-computerized checkout processing of the personal experience as a purchased product, including:

obtaining payment from the user for purchase of the personal experience with the luminary;

generating for display on a computing device associated with the luminary at least one fulfillment display interface that is automatically customized by including one or more second fields, which are displayed for completion by the luminary, wherein the one or more second fields are automatically populated based on the Boolean variables associated with the personal experience purchased by the user;

generating for display to the luminary a user interface that comprises two or more of:

a calendar that displays date and time that the personal experience is scheduled to occur, based on presence of a preset time flag associated with the first product;

first indicia based on a negotiable time flag and/or a negotiable location flag associated with the first product, wherein the first indicia are displayed for interaction by the luminary to schedule the personal experience; and second indicia that display events to be fulfilled by the luminary, the second indicia including one or more data fields that are automatically populated for completion by the luminary based on the presence of Boolean flags associated with the first product selected by the user;

receiving input from the luminary indicating date and time availability for the personal experience with the user; and providing automated computerized notification to the user related to the purchased first product based on Boolean variables associated with the first product selected by the user.

31. The computer system of claim 30, the one or more programs comprising instructions for receiving data from the user viewing the products for purchase.

32. The computer system of claim 31, the one or more programs comprising instructions for offering the first product for purchase to the user based on one or both of a characteristic of the user and/or a characteristic of the first product.

33. The computer system of claim 32, wherein the characteristic of the user comprises a location of the user, a past purchase of the user, and a browsing history of the user.

* * * * *

UNITED STATES PATENT AND TRADEMARK OFFICE
CERTIFICATE OF CORRECTION

PATENT NO. : 10,546,342 B2
APPLICATION NO. : 15/347598
DATED : January 28, 2020
INVENTOR(S) : Traina et al.

Page 1 of 1

It is certified that error appears in the above-identified patent and that said Letters Patent is hereby corrected as shown below:

In the Claims

Claim 1, Column 28, Line 67, please delete "processor, the method" and insert --processors, the method--;

Claim 1, Column 29, Line 27, please delete "determination that that the" and insert --determination that the--.

Signed and Sealed this
Seventh Day of April, 2020

Andrei Iancu
*Director of the United States Patent and Trademark Office*